United States Patent
Ito et al.

(10) Patent No.: US 11,631,843 B2
(45) Date of Patent: Apr. 18, 2023

(54) NEGATIVE ELECTRODE ACTIVE MATERIAL, PRODUCTION METHOD OF SAME, THIN-FILM ELECTRODE, BATTERY, BATTERY PACK, ELECTRONIC DEVICE, ELECTRIC VEHICLE, POWER STORAGE DEVICE, AND POWER SYSTEM

(71) Applicant: MURATA MANUFACTURING CO., LTD., Kyoto (JP)

(72) Inventors: Daisuke Ito, Kyoto (JP); Go Sudo, Kyoto (JP)

(73) Assignee: Murata Manufacturing Co., Ltd., Kyoto (JP)

(*) Notice: Subject to any disclaimer, the term of this patent is extended or adjusted under 35 U.S.C. 154(b) by 259 days.

(21) Appl. No.: 16/784,509

(22) Filed: Feb. 7, 2020

(65) Prior Publication Data
US 2020/0176760 A1  Jun. 4, 2020

Related U.S. Application Data

(63) Continuation of application No. PCT/JP2018/029641, filed on Aug. 7, 2018.

(30) Foreign Application Priority Data

Aug. 9, 2017 (JP) .............................. JP2017-154682

(51) Int. Cl.
*H01M 4/36* (2006.01)
*H01M 4/48* (2010.01)
*H01M 4/02* (2006.01)

(52) U.S. Cl.
CPC .......... *H01M 4/364* (2013.01); *H01M 4/483* (2013.01); *H01M 2004/027* (2013.01)

(58) Field of Classification Search
None
See application file for complete search history.

(56) References Cited

U.S. PATENT DOCUMENTS

| 2005/0233213 | A1 | 10/2005 | Lee et al. | |
|---|---|---|---|---|
| 2012/0107683 | A1* | 5/2012 | Kim | H01M 4/48 252/502 |
| 2014/0110639 | A1 | 4/2014 | Yamamura | |

(Continued)

FOREIGN PATENT DOCUMENTS

| JP | 2003192327 A | * | 7/2003 |
|---|---|---|---|
| JP | 2003192327 A | | 7/2003 |

(Continued)

OTHER PUBLICATIONS

International Search Report for Application No. PCT/JP2018/029641, dated Oct. 9, 2018.

(Continued)

*Primary Examiner* — Zhongqing Wei
(74) *Attorney, Agent, or Firm* — K&L Gates LLP

(57) ABSTRACT

A negative electrode active material includes a matrix including at least a first element selected from the group consisting of silicon, tin, and germanium, at least a second element selected from the group consisting of copper, boron, phosphorous, aluminum, gallium, arsenic, antimony, lithium, and sodium, and oxygen. The second element bonds with oxygen; and a cluster includes the first element and is dispersed in the matrix.

20 Claims, 12 Drawing Sheets

(56) References Cited

U.S. PATENT DOCUMENTS

| | | | |
|---|---|---|---|
| 2014/0295282 A1* | 10/2014 | Harada | C01G 45/1278 |
| | | | 429/231.1 |
| 2016/0254525 A1 | 9/2016 | Hirose et al. | |
| 2017/0271889 A1* | 9/2017 | Sugeno | H02J 7/008 |

FOREIGN PATENT DOCUMENTS

| | | | | |
|---|---|---|---|---|
| JP | 2005259697 A | 9/2005 | | |
| JP | 2011-192453 | 9/2011 | | |
| JP | 2011192453 A | 9/2011 | | |
| JP | 2013008567 A | 1/2013 | | |
| JP | 2014139919 A | 7/2014 | | |
| JP | 2015111547 A | 6/2015 | | |
| WO | WO-2016051635 A1 * | 4/2016 | | B60L 58/22 |

OTHER PUBLICATIONS

Japanese Office Action dated Jul. 6, 2021 in corresponding Japanese Application No. 2019-535683.

Japanese Office Action dated Dec. 1, 2020 in corresponding Japanese Application No. 2019-535683.

Chinese Office Action dated Jul. 25, 2022 in corresponding Chinese Application No. 201880051730.0.

* cited by examiner

Cu-ADDED, WITHOUT HEAT TREATMENT

Cu-ADDED, WITH 800°C HEAT TREATMENT

No crystalline phases, but amorphous
clusters of 1 to 2 nm found
(Cu metal, Cu silicide,
Cu silicate were also not found.)

1.9Å
3.1Å

SIMULATION OF a-Si

HALO PATTERN
(A thin ring observed → From Ring radius,
the cluster was deduced as a-Si.)

NEGATIVE ELECTRODE ACTIVE MATERIAL, PRODUCTION METHOD OF SAME, THIN-FILM ELECTRODE, BATTERY, BATTERY PACK, ELECTRONIC DEVICE, ELECTRIC VEHICLE, POWER STORAGE DEVICE, AND POWER SYSTEM

CROSS REFERENCE TO RELATED APPLICATIONS

The present application is a continuation of PCT patent application no. PCT/JP2018/029641, filed on Aug. 7, 2018, which claims priority to Japanese patent application no. JP2017-154682 filed on Aug. 9, 2017, the entire contents of which are being incorporated herein by reference.

BACKGROUND

The present disclosure generally relates to a negative electrode active material, a production method of the same, thin-film electrode, a battery, a battery pack, an electronic device, an electric vehicle, a power storage device, and a power system.

Recently, there has been an urgent need of developing technique to increase a capacity of a lithium ion secondary battery.

As a negative electrode active material attaining a higher capacity than carbon-based materials, development of Si-based materials has been carried out globally. Among such Si-based materials, one of materials with the best cycle property is silicon oxide ($SiO_x$). Silicon oxide has such an advantage that stability of Si—O—Si bonding via oxygen can down-regulate structural destruction that would be caused by swelling and shrinking. On the other hand, it is known that silicon oxide is low in initial charging and discharging efficiency.

SUMMARY

The present disclosure generally relates to a negative electrode active material, a production method of the same, thin-film electrode, a battery, a battery pack, an electronic device, an electric vehicle, a power storage device, and a power system.

An object of the present disclosure is to provide a negative electrode active material and a production method thereof, a thin-film electrode, a battery, and a battery pack, electronic device, an electric vehicle, a power storage device, and a power system including the battery, each of which can improve initial charging and discharging efficiency.

According to an embodiment of the present disclosure, a negative electrode active material is provided. The negative electrode active material includes a matrix including at least a first element selected from the group consisting of silicon, tin, and germanium, at least a second element selected from the group consisting of copper, boron, phosphorous, aluminum, gallium, arsenic, antimony, lithium, and sodium, and oxygen. The second element bonds with oxygen; and a cluster includes the first element and is dispersed in the matrix.

According to an embodiment of the present disclosure, a production method of a negative electrode active material is provided. the production method includes thermally vaporizing a material including at least a first element selected from the group consisting of silicon, tin, and germanium, oxide, and at least a second element selected from the group consisting of copper, boron, phosphorous, aluminum, gallium, arsenic, antimony, lithium, and sodium.

According to an embodiment of the present disclosure, a thin film electrode is provided. The thin film electrode includes a current collector; and a thin film provided on the current collector, the thin film including the negative electrode active material according to the embodiments as described herein.

According to an embodiment of the present disclosure, a battery is provided. The battery includes a negative electrode including the negative electrode active material according to the embodiments as described herein; a positive electrode; and an electrolyte.

According to an embodiment of the present disclosure, a battery pack is provided. The battery pack includes the battery according to the embodiments as described herein; and a controller configured to control the battery.

According to an embodiment of the present disclosure, an electronic device is provided. The electronic device includes the battery according to the embodiments as described herein, the electronic device being configured to receive power supplied from the battery.

According to an embodiment of the present disclosure, an electric vehicle is provided. The electric vehicle includes the battery according to the embodiments as described herein; a converter configured to receive power from the battery and convert the power into a driving power of the electric vehicle; and a controller configured to perform information processing regarding vehicle control according to information regarding the battery.

According to an embodiment of the present disclosure, a power storage device is provided. The power storage device includes the battery according to the embodiments as described herein, the power storage device being configured to supply power to an electronic device connected to the battery.

According to an embodiment of the present disclosure, a power system is provided. The power system includes the battery according to the embodiments as described herein, the power system being configured to receive power supplied from the battery.

According to the present disclosure, it becomes possible to improve initial charging and discharging efficiency. It should be noted that the advantageous effect described herein is not to limit the present invention, and the present invention may have only any one of advantageous effects described in the present disclosure, or may have an advantageous effect different from the advantageous effects described in the present disclosure.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
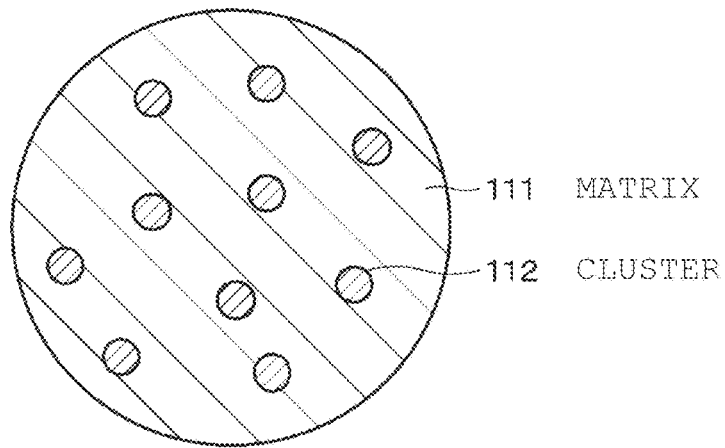
FIG. 1 is a cross-sectional view illustrating one example of a configuration of a negative electrode active material according to an embodiment of the present disclosure.

A negative electrode active material according to a first exemplary embodiment of the present disclosure includes powder of negative electrode active material particles. The negative electrode active material is, for example, for non-aqueous electrolyte secondary battery such as lithium ion secondary battery. The negative electrode active material particles include, as illustrated in FIG. 1, at least one first element selected from the group consisting of silicon (Si), tin (Sn), and germanium (Ge), at least one second element selected from the group consisting of copper (Cu), boron (B), phosphorous (P), aluminum (Al), gallium (Ga), arsenic (As), antimony (Sb), and sodium (Na), and oxygen (O), wherein the negative electrode active material includes a matrix 111 in which the second element bonds with oxygen, and a cluster 112 dispersed in the matrix 111 and including the at least one first element.

The bonding between the second element and oxygen in the matrix 111 is covalent bonding. X-ray Photoelectron Spectroscopy (XPS) can determine whether or not the bonding between the second element and oxygen in the matrix 111 is covalent bonding. It is preferable that the matrix 111 be amorphous for improving the cycle property. It is preferable that the cluster 112 be amorphous for improving the cycle property. Cross-sectional Transmission Electron Microscope (TEM) observation can determine whether or not the matrix 111 and the cluster 112 are amorphous.

The second element has a concentration distribution that is substantially constant from a surface to a center of the positive electrode active material particle. More specifically, the cluster 112 are substantially uniformly distributed in the whole matrix 111. The second element and the cluster 112 have such distributions due to addition of the second element in raw materials at a stage of synthesizing the positive electrode active material particles, as described below.

The matrix has bonding represented by the following general formula (I):

M1-O-M2    (I), (wherein M1 is a first element and M2 is a second element.)

An average size of the cluster 112 is preferably 2 nm or less. If the average size of the cluster 112 is 2 nm or less, it becomes possible to down-regulate the structural destruction of the negative electrode active material particles caused by swelling and shrinking. Moreover, it becomes possible to down-regulate crystallization of the cluster 112 caused by charging and discharging. The down-regulation of the structural destruction and the crystallization makes it possible to improve the cycle property. A lower limit of the cluster 112 is not particularly limited, but for example may be 0.5 nm or more.

The average size of the cluster 112 can be worked out as below. To begin with, cross sections of negative electrode active material particles are cut with a focused ion beam (FIB). Next, cross-sectional TEM images of the negative electrode active material particles are captured by using TEM, and ten clusters 112 were selected randomly from the TEM image thus captured, and cross sectional areas of the clusters 112 are measured by image processing and a particle diameter (diameter) of each particle is worked out on the assumption that the cross sections of the clusters 112 are circular. Then, the particle diameters of the ten particles thus worked out are simply averaged (arithmetically averaged) to work out an average particle diameter, which is then taken as an average size of the cluster 112.

It is preferable that a content amount of the first element be not less than 30 at % but not more than 70 at % in a total amount of the first element, the second element, and oxygen.

It is preferable that a content amount of the second element be not less than 1 at % but not more than 30 at % in the total amount of the first element, the second element, and oxygen. It is preferable that a content amount of oxygen be not less than 20 at % but not more than 70 at % in the total amount of the first element, the second element, and oxygen. The content amounts of the first and second elements and oxygen can be measured by the X-ray photoelectron spectroscopy.

The negative electrode active material particles substantially do not include (1) a first compound in which the first element bonds with the second element, and (2) a second compound constituted with a tetrahedron of first element oxide, and positive ions of the second element in gaps between tetrahedrons of the first element oxide. Here, concreate examples of the first element oxide include at least one of silicon oxide, tin oxide, or germanium oxide. If the first element is silicon, the first compound will be silicide compound and the second compound will be silicate compound.

Here, what is meant by "substantially not including the first compound and the second compound" is that a content amount of the first compound is 0.1 at % or less with respect to a third compound in which the second element bonds with oxygen, and a content amount of the second compound is 0.1 at % or less with respect to the third compound in which the second element bonds with oxygen. The content amounts of the first, second, and third compounds can be measured by the X-ray photoelectron spectroscopy.

In a case where the first element includes silicon and the second element includes copper, the negative electrode active compound would have such a Cu2p waveform obtained by X-ray photoelectron spectroscopy that there is not a peak top in a range of a bonding energy not less than 931 eV but less than 933 eV, but there is a peak top in a range of a bonding energy not less than 933 eV but not more than 935 eV. Peaks having a peak top in the range of a bonding energy not less than 931 eV but less than 933 eV attribute to Cu, $Cu_2O$ or $Cu_3Si$. On the other hand, peaks having a peak top in a range of a bonding energy not less than 933 eV but not more than 935 eV attribute to Cu—O or Si—O—Cu.

One example of the production method of the negative electrode active material according to the first exemplary embodiment will be described below. The production method of the negative electrode active material is to synthesize the negative electrode active material by co-vapor deposition.

To begin with, powder of at least one first element selected from the group consisting of silicon, tin, and germanium, oxide of the at least one first element, and powder of at least one second element selected from the group consisting of cupper, boron, phosphorous, aluminum, gallium, arsenic, antimony, and sodium are mixed together to obtain a mixture. Next, the mixture is immersed in a solvent such as water and uniformly dispersed by an ultrasonic bath or the like. After that, the solvent is dried off, thereby solidifying the mixture. When solidifying powder immersed in a liquid, capillary suction pressure will occur between particles due to surface tension. The capillary suction pressure uniformly solidifies the powder as the vapor deposition material. The smaller the particle diameter of the second element, the smaller splash (melted particles splashed due to non-uniform evaporation) occurred, thereby attaining a uniform film. For some of the second elements that are especially low in melting point, it is preferable that such second element be particles of small particle diameters of 5 μm or less.

Next, a thin film is deposited on a substrate with the mixture thus solidified as a vapor deposition source by the co-vapor deposition. More concretely, the mixture thus solidified is put in a crucible in a vacuum chamber, and heated and evaporated by an electron beam, and deposited on a substrate placed to face the crucible. In this way, a thin film (negative electrode active material layer) is obtained. After that, the thin film is peeled off from the substrate and crushed. In this way, the negative electrode active material in a powder form is obtained.

The negative electrode active material according to the first exemplary embodiment includes at least one first element selected from the group consisting of silicon, tin, and germanium, and at least one second element selected from the group consisting of cupper, boron, phosphorous, aluminum, gallium, arsenic, antimony, and sodium, and oxygen, and includes a matrix 111 in which the second element bonds with oxygen, and a cluster 112 dispersed in the matrix 111 and including the at least one first element. With this configuration, it becomes possible to down-regulate Li trap phenomenon (that is, Li loss to occur) caused by non-stoichiometric oxygen. Therefore, it becomes possible to improve the initial charging and discharging efficiency. Moreover, the bonding between the second element and oxygen makes it possible to down-regulate the non-uniform distribution of silicon (aggregation of silicon). Therefore, it is possible to improve the cycle property.

On the other hand, the negative electrode active material of Patent Document 2 includes a silicon oxide represented by the general formula $SiO_x$ (where $0<x<2$), and a silicate compound. Moreover, Patent Document 2 is such that such co-existence of the silicon oxide $SiO_x$ and silicate compound makes it possible to prevent the conducting ions from entering the Si defects, thereby making it possible to effectively down-regulate the proceeding of the consequent irreversible reaction. This can down-regulate the irreversible side reaction between $SiO_x$ and conducting ions such as lithium ions.

Therefore, the negative electrode active material according to the first exemplary embodiment and the negative electrode active material of Patent Document 2 are different in terms of their structures and mechanisms for improving the initial charging and discharging efficiency.

In the negative electrode active material according to Patent Document 1, lithium would be possibly eluted out of the particles thereby to deteriorate the safety, because the oxygen site is bonded with lithium. On the other hand, the negative electrode active material according to the first exemplary embodiment is such that, instead of bonding the oxygen site with lithium, the oxygen site is bonded with at least one selected from the group consisting of cupper, boron, phosphorous, aluminum, gallium, arsenic, antimony, and sodium, so that lithium will not be eluted out of the particles. Therefore, this configuration makes it possible to improve the safety of the negative electrode active material as well as the initial charging and discharging efficiency.

Furthermore, in a case of lithium pre-doping, lithium and oxygen bond together, thereby forming a matrix including bonding represented by Si—O—Li. This matrix is soluble in water or a polar solvent, whereby the deterioration of the negative electrode active material would be possibly facilitated, thereby deteriorating the cycle property. On the other hand, the first exemplary embodiment is configured such that the second element is pre-doped, so that the second element is bonded with oxygen, thereby forming a matrix 111 including the bonding represented by the general formula (1). The matrix 111 is insoluble or difficult to solve in water or a polar solvent, thereby not facilitating the deterioration of the negative electrode active material. Therefore, it is possible to improve the cycle property.

When the negative electrode active material is silicon oxide ($SiO_x$), lithium trap phenomenon caused by oxygen would occur, thereby causing lithium loss. More specifically, lithium loss of losing lithium substantially in the same molar ratio with oxygen would occur, thereby decreasing the initial charging and discharging efficiency to 68%.

The second element is easy to disperse among the first element and the first element oxide. Thus, in the case where the negative electrode active material is prepared by co-vapor deposition with such a vapor deposition source that includes the first element, the first element oxide, and the second element, the negative electrode active material is improved in electron conductivity, thereby becoming easier to collect electrons.

In a case where the second element is post-added to a negative electrode active material including the first element oxide after the negative electrode active material is prepared, uniform distribution of the second element in the negative electrode active material would be possibly lowered. On the other hand, in the production method of the negative electrode active material according to the first exemplary embodiment, the second element is pre-added at the stage of synthesizing the negative electrode active material. That is, the negative electrode active material is synthesized by co-vapor deposition with the vapor deposition source including the first element, the first element oxide, and the second element. Therefore, it becomes possible to improve the uniform distribution of the second element in the negative electrode active material.

According to the production method of the negative electrode active material according to the first exemplary embodiment, it becomes possible to attain a good initial charging efficiency even without heat treatment. Thus, it becomes possible to simplify the process. However, the negative electrode active material may be heat-treated, if necessary.

The form of the negative electrode active material is not limited to powder, but may be a thin-film form, block form, or the like.

The negative electrode active material particles may include no cluster including the first element. In this case, the cycle property can be further improved.

The negative electrode may be prepared by using a negative electrode current collector as the substrate on which the thin film (negative electrode active material layer) is to be deposited, and directly forming the thin film (negative electrode active material layer) on the negative electrode current collector by the co-vapor deposition. In this case, the negative electrode active material layer can be formed without using a binder or a conductivity auxiliary agent.

Even though the first exemplary embodiment descries the case where the thin film is crushed to produce the powder of the negative electrode active material, the powder of the negative electrode active material may be synthesized by co-vapor deposition. More specifically, the negative electrode active material may be synthesized with a vacuum vapor deposition device having a chamber configured to cool, in such a way that the mixture as the vapor deposition source is evaporated and cooled to condensate, thereby synthesizing the powder of the negative electrode active material.

The second element may be at least one selected from the group consisting of cupper, boron, phosphorous, aluminum, gallium, arsenic, antimony, lithium, and sodium.

The first exemplary embodiment described above explains the case where the mixture (vapor deposition source) is heated by the electron beam. However, the heating of the mixture (vapor deposition source) may be carried out with heating means other than the electron beam. However, heating means capable of heating the mixture (vapor deposition source) to 1700° C. is preferable. However, the heating temperature is not limited to 1700° C., and for example, the heating temperature can be as low as 1100° C. by mixing another element such as carbon or metal therein according to the Ellingham diagram showing the reactivity with oxygen.

In the case where a metal is used as a second element, it is preferable that the powder of the second element be 10 µm or less in particle diameter. Because this can down-regulate the generation of metal droplets (melted particles of the metal elemental substance). The forms of the first and second elements and the first element oxide are preferably powder as in the first exemplary embodiment, but are not limited to this.

The first exemplary embodiment described above explains the case where the powder of the first element, the powder of the first element oxide, and the powder of the second element are mixed together to prepare the vapor deposition source, but the preparation method of the vapor deposition source is not limited to this. For example, instead of the powder of the second element, or together with the powder of the second element, powder of at least one selected from the group consisting of oxide, nitride, chloride, carbide, sulfide, bromide, fluoride, iodide, sulfate, carbonate, nitrate, acetate of the second element, and organic metals may be used. Moreover, instead of silicon as the first element, metal silicide may be used. As the first element oxide, metal silicate may be used instead of silica dioxide.

A second exemplary embodiment will explain a secondary battery including a negative electrode including the negative electrode active material according to the first exemplary embodiment.

Figure 2:
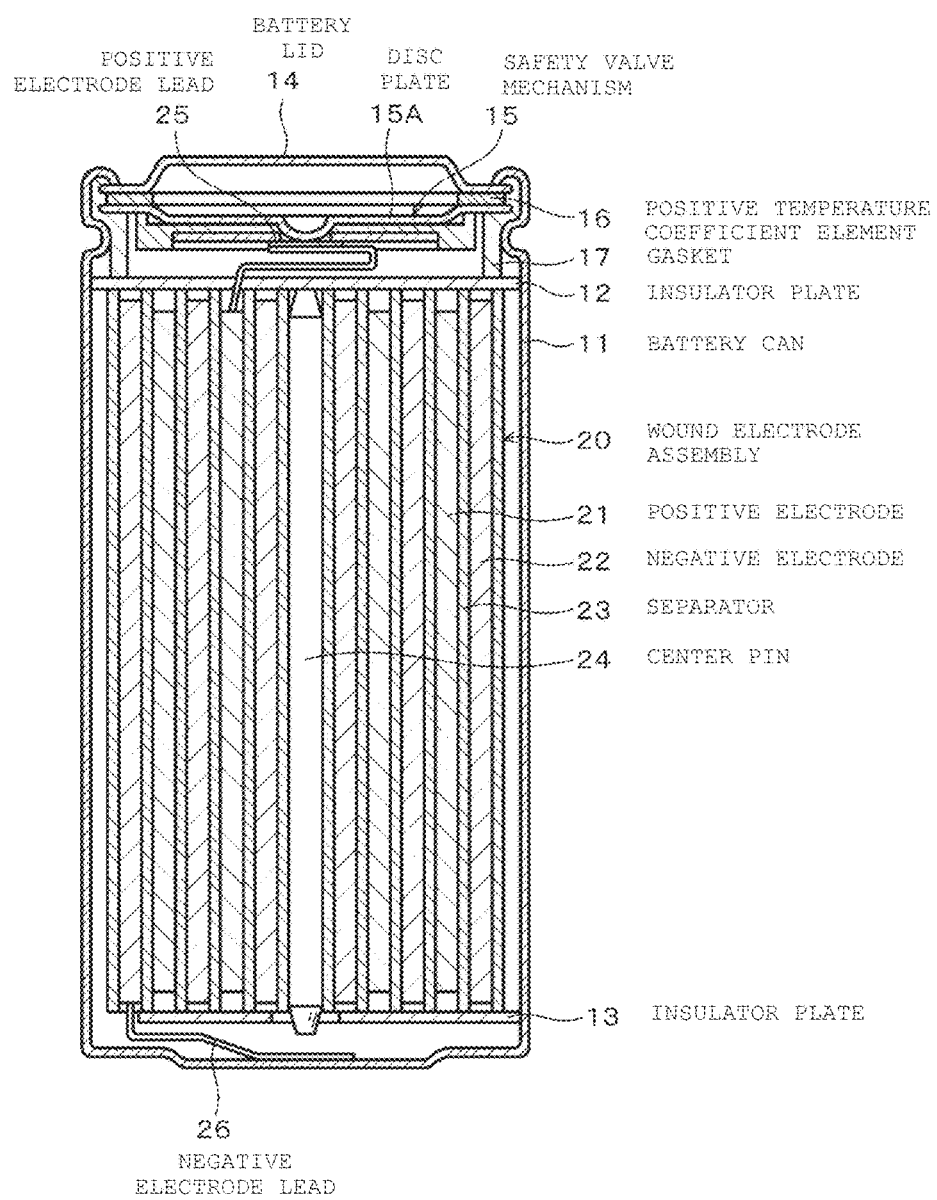
FIG. 2 is a cross-sectional view illustrating an example of a configuration of a non-aqueous electrolyte secondary battery according to an embodiment of the present disclosure.

Hereinafter, an example of configuration of a non-aqueous electrolyte secondary battery (hereinafter, simply referred to as "battery") according to a second exemplary embodiment of the present disclosure will be described with reference to FIG. 2. The battery is a so-called lithium ion secondary battery, for example, for which the capacity of its negative electrode is represented by a capacity component based on intercalation and deintercalation of lithium which is an electrode reaction substance. The battery is of a so-called cylinder type and has, inside a battery can 11 which is hollow and substantially columnar, a wound electrode assembly 20 obtained by winding a pair of a belt-shaped positive electrode 21 and a belt-shaped negative electrode 22 which are layered to interpose a separator 23. The battery can 11 is configured of iron plated with nickel, one end part thereof is closed and the other end part is opened. The electrolyte solution is injected into the battery can 11 as an electrolyte in a liquid form, and is impregnated into the positive electrode 21, the negative electrode 22 and the separator 23. Moreover, a pair of insulator plates 12 and 13 are disposed perpendicular to the circumferential surface of winding to interpose the wound electrode assembly 20.

To the opening end part of the battery can 11, a battery lid 14, a safety valve mechanism 15 provided at the inner side of the battery lid 14, and a positive temperature coefficient (PTC) element 16 are attached by crimping via an opening sealing gasket 17. Thereby, the inside of the battery can 11 is sealed. The battery lid 14 is configured, for example, of a material similar to that of the battery can 11. The safety valve mechanism 15 is electrically connected to the battery lid 14 and on the occasion that the inner pressure of the battery is not less than a certain value due to internal short, heating from the outside or the like, a disc plate 15A is configured to reverse so as to cut the electric connection between the battery lid 14 and the wound electrode assembly 20. The opening sealing gasket 17 is configured, for example, of insulative material and its surface is applied with asphalt.

Through the center of the wound electrode assembly 20, for example, a center pin 24 is inserted. A positive electrode lead 25 made of aluminum or the like is connected to a positive electrode 21 of the wound electrode assembly 20, and a negative electrode lead 26 made of nickel or the like is connected to a negative electrode 22. The positive electrode lead 25 is welded to the safety valve mechanism 15 to be electrically connected to the battery lid 14, and the negative electrode lead 26 is welded to the battery can 11 to be electrically connected thereto.

Figure 3:
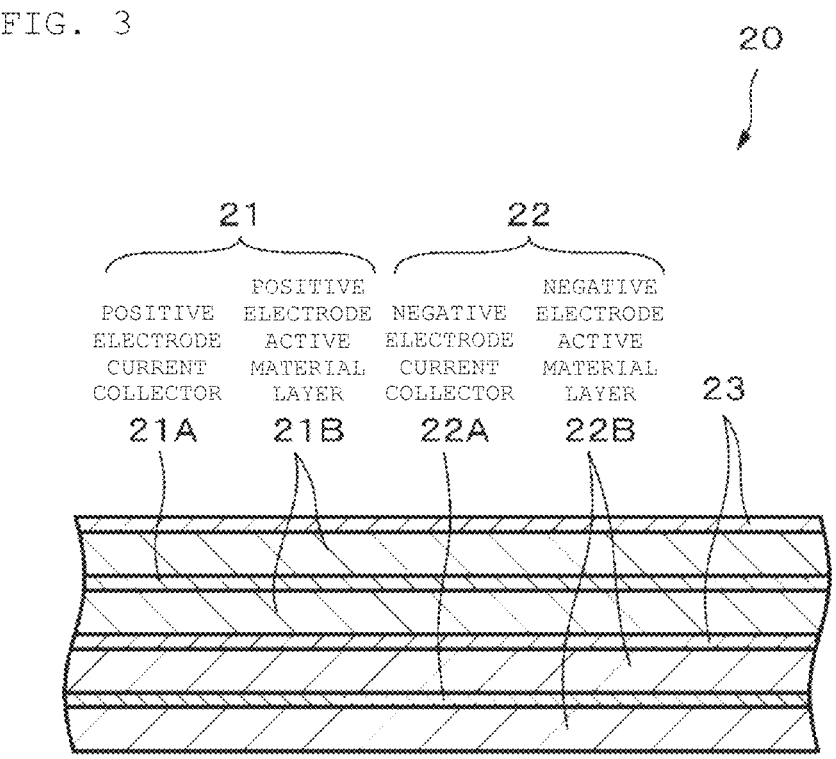
FIG. 3 is a cross-sectional view illustrating an enlarged part of a wound electrode assembly shown in FIG. 2.

The positive electrode 21, the negative electrode 22, the separator 23, and the electrolyte solution of the battery will be sequentially described below with reference to FIG. 3.

The positive electrode 21 has, for example, a structure in which a positive electrode active material layer 21B is provided on both sides of a positive electrode current collector 21A. Although not illustrated, the positive electrode active material layer 21B may be provided on only one side of the positive electrode current collector 21A. The positive electrode current collector 21A is made of a metal foil, for example, an aluminum foil, a nickel foil, or a stainless steel foil. The positive electrode active material layer 21B includes a positive electrode active material capable of intercalation and deintercalation of lithium. The positive electrode active material layer 21B may further include at least one of a conductive agent and a binder as necessary.

As the positive electrode active material, for example, lithium-containing compounds such as lithium oxide, lithium phosphorus oxide, lithium sulfide, and lithium-containing intercalation compound are suitable, and two or more of them may be used in combination. For attaining a higher energy density, a lithium-containing compound including lithium, a transition metal element, and oxygen is preferable. Examples of such a lithium-containing compound include a lithium composite oxide having a lamellar rock-salt like structure represented by Formula (A), and a lithium composite phosphate having an olivine type structure. It is more preferable that the lithium-containing compound include, as the transition metal element, at least one selected from the group consisting of cobalt (Co), nickel, manganese (Mn), and iron. Examples of such a lithium-containing compound include lithium composite oxides having lamellar rock salt-like structure represented by Formulae (C), (D), and (E), a lithium composite oxide having a spinel type structure represented by Formula (F), and a lithium composite phosphate having an olivine type structure represented by Formula (G). More specifically, the examples include $LiNi_{0.50}Co_{0.20}Mn_{0.30}O_2$, $Li_aCoO_2$ (where a=1), $Li_bNiO_2$ (where b≈1), $Li_{c1}Ni_{c2}Co_{1-c2}O_2$ (where c1≈1, 0<C2<1), $Li_dMn_2O_4$ (where d≈1), and $Li_eFePO_4$ (where e≈1), and the like.

$$Li_pNi_{(1-q-r)}Mn_qM1_rO_{(2-y)}X_z \quad (A),$$

(where M1 is at least one selected from the Group 2 to 15 elements except nickel and manganese, X is at least one selected from the Group 16 and 17 elements except oxygen, and p, q, y, and z are such that 0≤p≤1.5, 0≤q≤1.0, 0≤r≤1.0, −0.10≤y≤0.20, and 0≤z≤0.2.)

$$Li_aM2_bPO_4 \quad (B),$$

(where M2 is at least one selected from the Group 2 to 15 elements, a and b are such that 0≤a≤2.0, and 0.5≤b≤2.0.)

$$Li_fMn_{(1-g-h)}Ni_gM3_hO_{(2-j)}F_k \quad (C)$$

(where M3 is at least one selected from the group consisting of cobalt, magnesium (Mg), aluminum, boron, titanium (Ti), vanadium (V), chrome (Cr), iron, copper, zinc (Zn), zirconium (Zr), molybdenum (Mo), tin, calcium (Ca), strontium (Sr), and tungsten (W), and f, g, h, j, and k are values within such ranges that 0.8≤f≤1.2, 0<g<0.5, 0≤h≤0.5, g+h<1, −0.1≤j≤0.2, and 0≤k≤0.1, where a lithium composition varies depending on a charging and discharging state, and f indicates a value in a full discharging state.)

$$Li_mNi_{(1-n)}M4_nO_{(2-p)}F_q \quad (D)$$

(where M4 is at least one selected from the group consisting of cobalt, manganese, magnesium, aluminum, boron, titanium, vanadium, chrome, iron, copper, zinc, molybdenum, tin, calcium, strontium, and tungsten, and m, n, p, and q are values within such ranges that 0.8≤m≤1.2, 0.005≤n<0.5, −0.1≤p≤0.2, and 0≤q≤0.1, where a lithium composition varies depending on a charging and discharging state, and m indicates a value in a full discharging state.)

$$Li_rCo_{(1-s)}M5_sO_{(2-t)}F_u \quad (E)$$

(where M5 is at least one selected from the group consisting of nickel, manganese, magnesium, aluminum, boron, titanium, vanadium, chrome, iron, copper, zinc, molybdenum, tin, calcium, strontium, and tungsten, and r, s, t, and u are values within such ranges that 0.8≤r≤1.2, 0≤s<0.5, −0.1≤t≤0.2, and 0≤u≤0.1, where a lithium composition varies depending on a charging and discharging state, and r indicates a value in a full discharging state.)

$$Li_vMn_{2-w}M6_wO_xF_y \quad (F)$$

(where M6 is at least one selected from the group consisting of cobalt, nickel, magnesium, aluminum, boron, titanium, vanadium, chrome, iron, copper, zinc, molybdenum, tin, calcium, strontium, and tungsten, and v, w, x, and y are values within such ranges that 0.9≤v≤1.1, 0≤w<0.6, 3.7≤x≤4.1, and 0≤y≤0.1, where a lithium composition varies depending on a charging and discharging state, and v indicates a value in a full discharging state.)

$$Li_zM7PO_4 \quad (G)$$

(where M7 is at least one selected from the group consisting of cobalt, manganese, iron, nickel, magnesium, aluminum, boron, titanium, vanadium, niobium (Nb), copper, zinc, molybdenum, calcium, strontium, tungsten, and zirconium, and z is a value within a range of 0.9≤z≤1.1, where a lithium composition varies depending on a charging and discharging state, and z indicates a value in a full discharging state.)

As the Ni-containing lithium composite oxide, a lithium composite oxide including lithium, nickel, cobalt, manganese, and oxygen (NCM), a lithium composite oxide including lithium, nickel, cobalt, aluminum, and oxygen (NCA), or the like may be used. As the Ni-containing lithium compound oxide, more specifically, one represented by the following Formula (H) or Formula (I).

$$Li_{v1}Ni_{w1}M1'_{x1}O_{z1} \tag{H}$$

(where 0<v1<2, w1+x1≤1, 0.2≤w1≤1, 0≤x1≤0.7, 0<z<3, and M1' is at least one element selected from transition metals such as cobalt, iron, manganese, copper, zinc, aluminum, chrome, vanadium, titanium, magnesium, and zirconium.)

$$Li_{v2}Ni_{w2}M2'_{x2}O_{z2} \tag{I}$$

(where 0<v2<2, w2+x2≤1, 0.65≤w2≤1, 0≤x2≤0.35, 0<z2<3, and M2' is at least one element selected from transition metals such as cobalt, iron, manganese, copper, zinc, aluminum, chrome, vanadium, titanium, magnesium, and zirconium.)

The examples of the positive electrode material capable of intercalation and deintercalation of lithium include inorganic compounds not containing lithium, such as $MnO_2$, $V_2O_5$, $V_6O_{13}$, NiS, and MoS.

The positive electrode material capable of intercalation and deintercalation of lithium may be a material other than these mentioned above. Moreover, two or more of the positive electrode materials exemplified above may be used in arbitrary combination.

As the binder, at least one selected from among, for example, resin materials such as polyvinylidene fluoride (PVdF), polytetrafluoroethylene (PTFE), polyacrylonitrile (PAN), styrene butadiene rubber (SBR), and carboxymethylcellulose (CMC), and a copolymer including such a resin material as a main component is used.

As the conductive agent, for example, a carbon material such as graphite, carbon fiber, carbon black, Ketjen black, or carbon nanotube is used, one kind of them may be used solely and two or more kinds of them may be mixed to be used. In addition, any metal material or conductive polymer material that is a material having conductivity may be used in addition to the carbon material.

The negative electrode 22 has, for example, a structure in which negative electrode active material layers 22B are provided on the both sides of a negative electrode current collector 22A. Although not illustrated, the negative electrode active material layer 22B may be provided on only one side of the negative electrode current collector 22A. The negative electrode current collector 22A is made of a metal foil, for example, a copper foil, a nickel foil or a stainless steel foil.

The negative electrode active material layer 22B includes one or two or more negative electrode active material(s) capable of intercalation and deintercalation of Li. The negative electrode active material layer 22B may further include at least one of a binding agent and a conductive agent, as needed.

For this battery, it is preferable that the negative electrode 22 or the negative electrode active material be configured to have an electrochemical equivalent greater than that of the positive electrode 21, so that theoretically lithium metal precipitation on the negative electrode 22 will not occur during the charging.

As the negative electrode active material, the negative electrode active material according to the first exemplary embodiment is used. The negative electrode active material according to the first exemplary embodiment may be used together with a carbon material. In this case, it becomes possible to attain an excellent cycle property as well as a high energy density.

Examples of the carbon material used with the negative electrode active material according to the first embodiment includes, for example, carbon materials such as hardly graphitizable carbon, easily graphitizable carbon, graphite, thermally decomposed carbons, cokes, glassy carbons, fired bodies of organic polymers, carbon fiber and activated carbon. Among these, the cokes include pitch cokes, needle cokes, petroleum cokes and the like. The fired bodies of organic polymers are carbons obtained by firing polymer materials such as phenol resin and furan resin at an appropriate temperature, and some of these are categorized as hardly graphitizable carbon or easily graphitizable carbon. These carbon materials are preferable for which change in crystal structure arising in charging or discharging is exceedingly small and which can attain high charge/discharge capacity and favorable cycle characteristics. Particularly, graphite is preferable which has a large electrochemical equivalent and can attain high energy density. Moreover, hardly graphitizable carbon is preferable which can attain excellent cycle characteristics. Furthermore, one which is low in charge/discharge potential, specifically, close to lithium metal in charge/discharge potential is preferable since it can easily realize high energy density of the battery.

As the binder, at least one selected from among, for example, resin materials such as polyvinylidene fluoride, polytetrafluoroethylene, polyacrylonitrile, styrene butadiene rubber, and carboxymethylcellulose, and a copolymer including such a resin material as a main component is used.

As the conductive agent, for example, a carbon material such as graphite, carbon fiber, carbon black, Ketjen black, or carbon nanotube is used, one kind of them may be used solely and two or more kinds of them may be mixed to be used. In addition, any metal material or conductive polymer material that is a material having conductivity may be used in addition to the carbon material.

The separator 23 separates the positive electrode 21 and the negative electrode 22, prevents a current short circuit due to contact of both electrodes, and allows lithium ions to pass. The separator 23 includes, for example, a porous membrane made of a resin including polytetrafluoroethylene, polypropylene or polyethylene, and may have a structure in which two or more of such porous membranes are laminated. Among these, a porous membrane made of a polyolefin is preferable because it has an excellent short circuit preventing effect and can improve safety of a battery according to a shutdown effect. In particular, the polyethylene is preferable as a material of the separator 23 because it can have a shutdown effect in a range of 100° C. or higher and 160° C. or lower and has excellent electrochemical stability. Also, a resin having chemical stability can be used in copolymerization with polyethylene or polypropylene or can be blended with polyethylene or polypropylene. As an alternative, the porous film may have such a structure that includes three or more layers in which a polypropylene layer, a polyethylene layer, and a polypropylene layer are laminated in this order.

The separator 23 may have such a structure that includes a substrate and a surface layer on one or each of sides of the substrate. The surface layer includes inorganic particles having electrical insulation property, and a resin material for adhering the inorganic particles on a surface of the substrate, and binding the inorganic particles together. For example, the resin material may be fibrillated, thereby having a three-dimensional network structure in which fibrils are continuously interconnected. By being held in the resin material having such a three-dimensional structure, the inorganic particles can be dispersed without being connected with each other. Moreover, the resin material may bind the inorganic particles to the surface of the substrate or bind the inorganic particles together without being fibrillated. In this case, a higher binding can be achieved. By having the surface layer on one or each of the sides of the substrate, it is possible to give the substrate an oxidation resistance, a heat resistance, and a mechanical strength.

The substrate is a porous layer having porosity. More specifically, the substrate is a porous film that is an insulating film having a large ion transmittance and a predetermined mechanical strength and is configured to hold the electrolysis solution in pores of the substrate. It is preferable that the substrate have the predetermined mechanical strength as a main part of the separator, and have a high resistance to the electrolysis solution, and a low reactivity, and be difficult to swell.

As a resin material constituting the substrate, polyolefin resins such as polypropylene and polyethylene, acryl resins, styrene resins, polyester resins, nylon resins, and the like are preferably usable. Especially, polyethylene such as low-density polyethylene, high-density polyethylene, and liner polyethylene, or low molecular weight wax thereof, or polyolefin resins such as polypropylene can be preferably usable due to their adequate melting temperatures and excellent availability. Furthermore, the porous film may have such a structure that two or more kinds of these porous films are laminated or may be a porous film prepared by melting and mixing two or more kinds of these resin materials. A separator including a porous film made from a polyolefin resin is excellent in separating the positive electrode 21 and the negative electrode 22, thereby making it possible to further reduce the deterioration of internal short-circuit.

The substrate may be a non-woven cloth. Fibers constituting the non-woven cloth may be aramid fibers, glass fibers, polyolefin fibers, polyethylene terephthalate (PET) fibers, nylon fibers, or the like. Moreover, the non-woven cloth may include a mix of two or more kinds of these fibers.

The inorganic particles include at least one of a metal oxide, a metal nitride, a metal carbide, a metal sulfide, or the like. As the metal oxide, aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), or the like may be suitably used. Moreover, as the metal nitride, silicon nitride ($Si_3N_4$), aluminum nitride (AlN), boron nitride (BN), titanium nitride (TiN) or the like may be suitably used. As the metal carbide, silicon carbide (SiC), boron carbide (B4C) or the like may be suitably used. As the metal sulfide, barium sulfate ($BaSO_4$) or the like may be suitably used. Moreover, minerals such as porous aluminosilicate such as zeolite ($M_{2/n}O \cdot Al_2O_3 \cdot xSiO_2 \cdot yH_2O$, where M is a metal element, $x \geq 2$, and $y \geq 0$), lamellar aluminosilicate, barium titanate ($BaTiO_3$), or strontium titanate are usable ($SrTiO_3$), too. Among them, it is preferable to use alumina, titania (especially titania with a rutile structure), silica, or magnesia, and it is more preferable to use alumina. The inorganic particles have an oxidation resistance and a heat resistance, so that the surface layer with the inorganic particles on the side facing to the positive electrode has a high resistance even to an oxidation environment near the positive electrode in charging.

A shape of the inorganic particles are not particularly limited, may be spherical, plate-like, fiber-like, cubic, random, or the like.

Examples of the resin material constituting the surface layer includes fluorine resins such as polyvinylidene and polytetrafluoroethylene, fluorine rubber such as vinylidene-tetrafluoroethylene copolymer and ethylene-tetrafluoroethylene copolymer, styrene-butadiene copolymer and a hydrides thereof, acrylonitrile-butadiene copolymer and a hydride thereof, acrylonitrile-butadiene-styrene copolymer and a hydride thereof, methacrylic ester-acrylic ester copolymer, styrene-acrylic ester copolymer, acrylonitrile-acrylic ester copolymer, rubber such as ethylene propylene rubber, polyvinyl alcohol, and polyvinyl acetate, cellulose derivatives such as ethyl cellulose, methyl cellulose, hydroxy ethyl cellulose, and carboxy methyl cellulose, polyamides such as polyphenyleneether, polysulfone, polyethersulfone, polyphenylene sulfide, polyetherimide, polyimide, wholly aromatic polyamide (aramid), polyamideimide, polyacrylonitrile, polyvinyl alcohol, polyether, acrylic acid resin, polyester, and the like, the resin having such a high heat resistance that at least one of a melting point and a glass transition temperature thereof is equal to or higher than 180° C. These resin materials may be used solely or two or more of them may be mixed and used in combination. Among them, in view of the oxidation resistance and flexibility, fluorine resins such as polyvinylidene fluoride is preferable, and in view of the heat resistance, it is preferable to include aramid or polyamideimide.

It is preferable that the inorganic particles be in a range of 1 nm to 10 μm in particle diameter. If the particle diameter is less than 1 nm, the availability is low, and even if such inorganic particles are available, the use thereof is not favorable in terms of cost. On the other hand, if the particle diameter is greater than 10 μm, an interelectrode distance would be excessively large, so that an amount of the active material filled in a limited space would not be sufficient, whereby a battery capacity would be low.

An exemplary applicable method for forming the surface layer may be a method including applying a slurry including a matrix resin, a solvent, and an inorganic material on a substrate (porous film), passing the substrate into a solvent bath of a solvent that is a poor solvent for the matrix resin and a good solvent for the solvent so as to cause phase separation thereof, and drying the substrate thereafter.

The inorganic particles may be contained in the porous film serving as the substrate. Furthermore, the surface layer may be constituted solely with a resin material without the inorganic particles.

The separator 23 is impregnated with an electrolysis solution which is electrolyte in a liquid form. The electrolysis solution contains a solvent and an electrolyte salt dissolved in the solvent. In order to improve a battery characteristic, the electrolysis solution may include a known additive.

As the solvent, a cyclic carbonate such as ethylene carbonate and propylene carbonate can be used and it is preferable to use one of ethylene carbonate and propylene carbonate, particularly, a mixture of both. This is because cycle characteristics can be improved.

In addition to these cyclic carbonates, as the solvent, an open-chain carbonate such as diethyl carbonate, dimethyl carbonate, ethyl methyl carbonate and methyl propyl carbonate is preferable to be used as a mixture with those. This is because high ion conductivity can be attained.

Furthermore, the solvent is preferable to contain 2,4-difluoroanisole and/or vinylene carbonate. This is because 2,4-difluoroanisole can improve discharge capacity and vinylene carbonate can improve cycle characteristics.

Accordingly, mixing these to be used is preferable since the discharge capacity and the cycle characteristics can be improved.

Other than these, examples of the solvent include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethylsulfoxide, and trimethyl phosphate.

In addition, a compound obtained by substituting fluorine for at least part of hydrogen of any of these non-aqueous solvents is sometimes preferable since reversibility of the electrode reaction can be sometimes improved depending on kinds of electrodes used as a combination.

Examples of the electrolyte salt include, for example, lithium salts, one kind of them may be used solely and two or more kinds of them may be mixed to be used. Examples of the lithium salts include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiCl$, lithium difluoro[oxolato-O,O']borate, lithium bisoxalate borate, and LiBr.

Above all, $LiPF_6$ is preferable to be able to attain high ion conductivity and improve cycle characteristics.

The positive electrode potential in the full charging state (vsLi/Li$^+$) is preferably higher than 4.20 V, more preferably 4.25 V or higher, further preferably higher than 4.40 V, especially preferably 4.45 V or higher, or most preferably 4.50 V or higher. However, positive electrode potential in the full charging state (vsLi/Li$^+$) may be 4.20 V or lower. An upper limit of the positive electrode potential in the full charging state (vsLi/Li$^+$) is not particularly limited, but is preferably 6.00 V or less, more preferably 5.00 V or less, further preferably 4.80 V or less, or especially preferably 4.70 V or less.

In the battery having the above-described configuration, when charging is performed, for example, lithium ions are deintercalated from the positive electrode active material layer 21B, and intercalated into the negative electrode active material layer 22B with the electrolysis solution interposed therebetween. In addition, when discharging is performed, lithium ions are deintercalated from the negative electrode active material layer 22B and intercalated into the positive electrode active material layer 21B with the electrolysis solution interposed therebetween.

The following will show an example of a method for manufacturing the battery according to the second exemplary embodiment of the present disclosure.

First, for example, a positive electrode compound is prepared by mixing the positive electrode active material, a conductive agent, and a binder, and a paste-form positive electrode compound slurry is produced by dispersing the positive electrode compound into a solvent such as N-methyl-2-pyrrolidinone (NMP). Next, the positive electrode compound slurry is applied on the positive electrode current collector 21A, the solvent is dried, and the dried mixture is compression molded with a rolling press machine or the like, so that the positive electrode active material layer 21B is formed and the positive electrode 21 is formed.

Further, for example, a negative electrode mixture is produced by mixing a negative electrode active material according to the first embodiment and a binder, and a paste-form negative electrode mixture slurry is prepared by dispersing this negative electrode mixture in a solvent such as N-methyl-2-pyrrolidone. Note that carbon materials may further be added to mix in addition to the negative electrode active material and the binder according to the first embodiment. Next, the negative electrode mixture slurry is applied on the negative electrode current collector 22A, the solvent is dried, and the dried mixture is compression molded with a rolling press machine or the like, so that the negative electrode active material layer 22B is formed and the negative electrode 22 is produced.

Next, the positive electrode lead 25 is attached to the positive electrode current collector 21A by welding or the like, and the negative electrode lead 26 is attached to the negative electrode current collector 22A by welding or the like. Next, the positive electrode 21 and the negative electrode 22 are wound via the separator 23. Next, the tip part of the positive electrode lead 25 is welded to the safety valve mechanism 15, the tip part of the negative electrode lead 26 is welded to the battery can 11, and the wound positive electrode 21 and negative electrode 22 are interposed between the pair of insulator plates 12 and 13 and are contained inside the battery can 11. Next, after the positive electrode 21 and the negative electrode 22 are contained inside the battery can 11, the electrolysis solution is injected into the battery can 11 to impregnate the separator 23. Next, the battery lid 14, the safety valve mechanism 15 and the positive temperature coefficient element 16 are fixed to the opening end part of the battery can 11 by crimping via the opening sealing gasket 17. Thereby, the battery shown in FIG. 2 is obtained.

With the battery according to the second exemplary embodiment, it becomes possible to improve the initial charging and discharging efficiency because the positive electrode active material layer 21B includes the positive electrode active material according to the first exemplary embodiment.

Even though the second exemplary embodiment describes the case where the negative electrode 22 includes the negative electrode current collector 22A and the negative electrode active material layer 22B being disposed on each side of the negative electrode current collector 22A and including the powder of the negative electrode active material particles, the configuration of the negative electrode 22 is not limited to this. For example, the negative electrode 22 may be a thin-film electrode including a negative electrode current collector and a thin film provided on each side of the negative electrode current collector. The thin film is formed from the negative electrode active material. The negative electrode active material is similar to the negative electrode active material according to the first exemplary embodiment, except that the negative electrode active material is shaped as the thin film.

Figure 4:
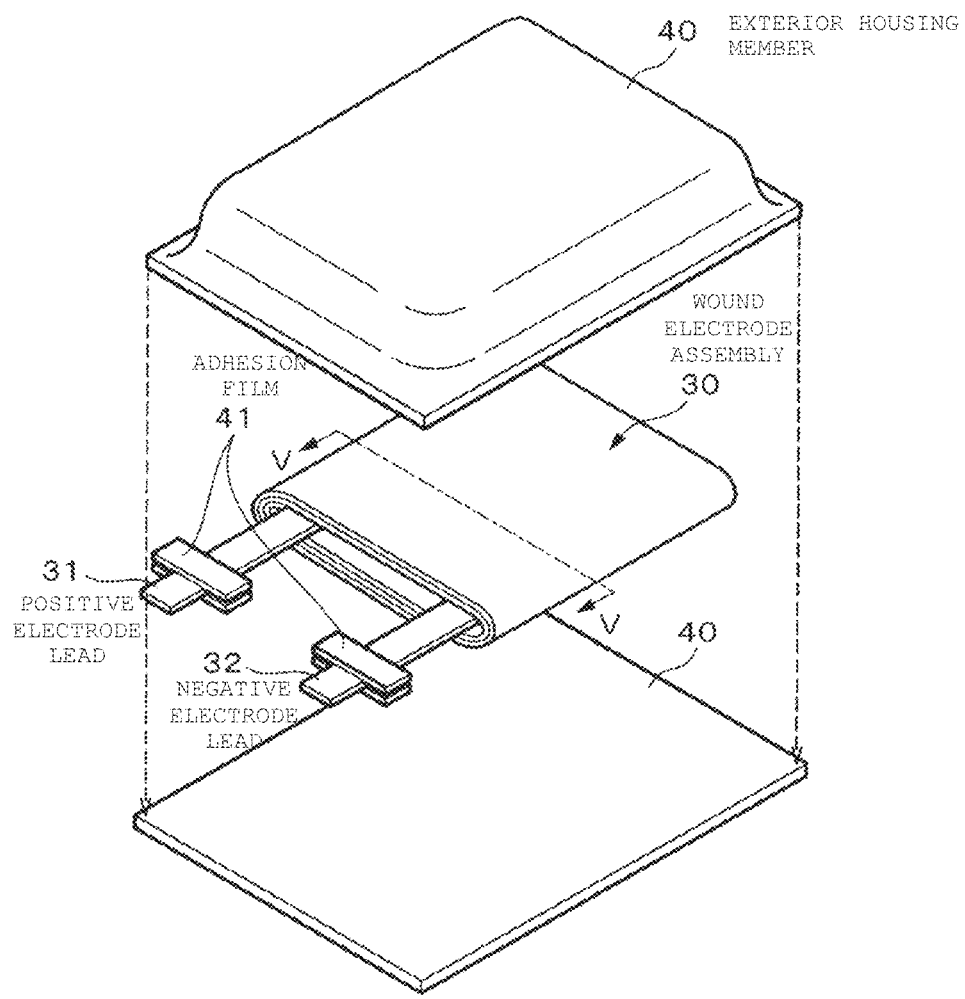
FIG. 4 is an exploded perspective view illustrating an example of a configuration of a non-aqueous electrolyte secondary battery according to an embodiment of the present disclosure.

As illustrated in FIG. 4, a battery according to a third exemplary embodiment of the present disclosure is a so-called laminate film-type battery, is configured such that a wound electrode assembly 30 including a positive electrode lead 31 and a negative electrode lead 32 is accommodated inside an exterior housing member 40 in a form of a film, thereby making it possible to attain further miniaturization, lighter weight, and thinner thickness.

Each of the positive electrode lead 31 and the negative electrode lead 32 is led out from the inside of the exterior housing member 40 toward the outside in the same direction, for example. The positive electrode lead 31 and the negative electrode lead 32 are each formed using, for example, a metal material such as aluminum, copper, nickel, or stainless steel, in a thin plate state or a network state.

Each of the exterior housing members 40 is configured, for example, of a rectangular aluminum laminate film obtained by pasting a nylon film, an aluminum foil and a polyethylene film in this order. Each of the exterior housing members 40 is disposed, for example, such that the polyethylene film side thereof faces the wound electrode assembly 30, and their outer edge parts adhere to each other by fusion or with an adhesive. Adhesion films 41 are inserted between the exterior housing members 40 and the positive electrode lead 31 and negative electrode lead 32 to prevent intrusion of the air. The adhesion film 41 is configured of a material having adherence with respect to the positive electrode lead 31 and the negative electrode lead 32, which material is, for example, polyolefin resin such as polyethylene, polypropylene, modified polyethelene and modified polypropylene.

It should be understood that the exterior housing member 40 may also be formed using a laminated film having another lamination structure, or a polymer film such as polypropylene or a metal film, instead of the above-described aluminum laminated film. Alternatively, a laminate film configured by using an aluminum film as a core and laminating a polymer film on one side or both sides thereof may be used.

Figure 5:
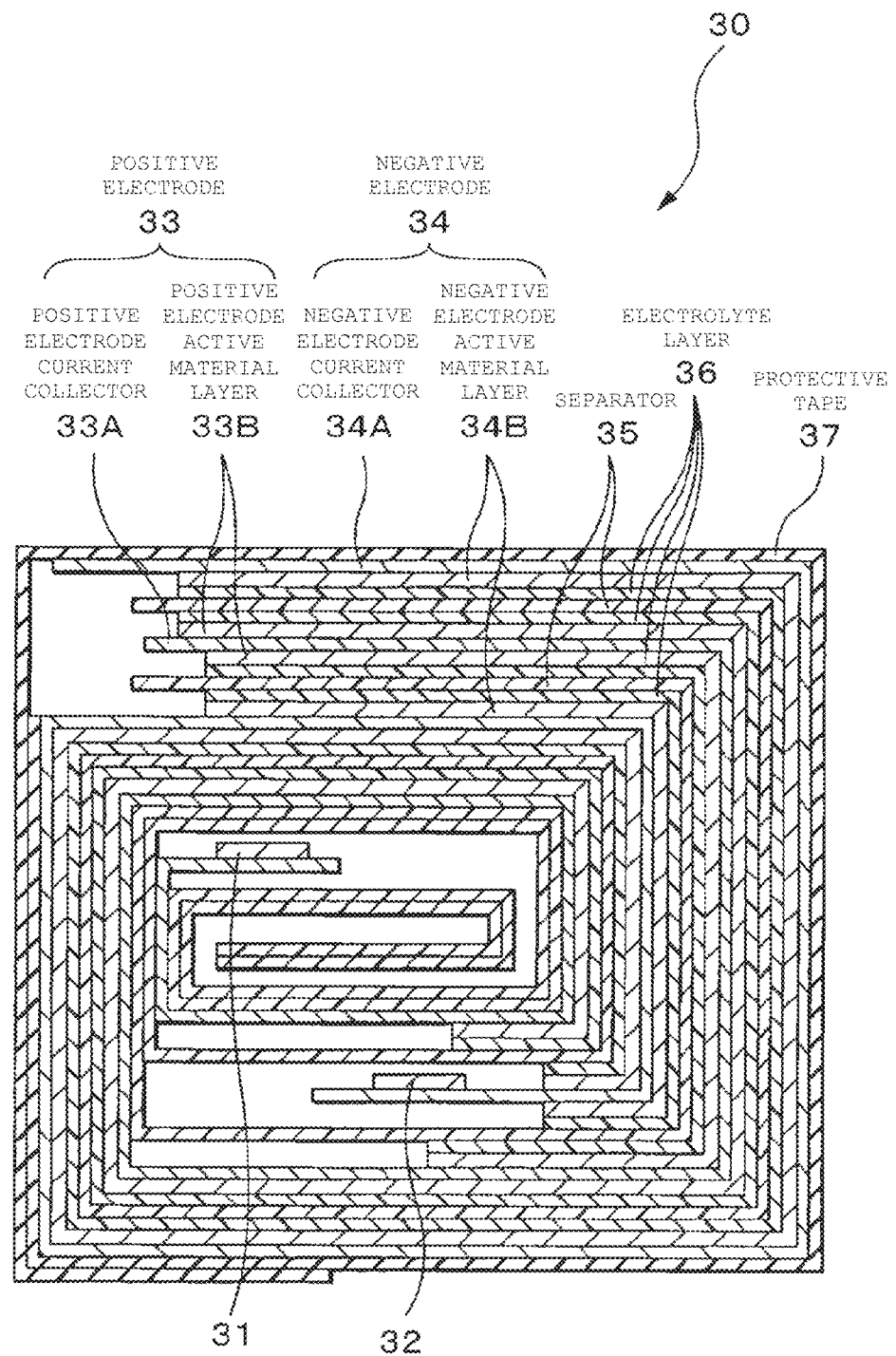
FIG. 5 is a cross-sectional view taken along V-V line in FIG. 4.

FIG. 5 shows a cross-sectional structure along V-V line of the wound electrode assembly 30 shown in FIG. 4. This wound electrode assembly 30 is prepared by laminating a positive electrode 33 and a negative electrode 34 with a separator 35 and an electrolyte layer 36 interposed therebetween and winding the laminate, and an outermost peripheral portion thereof is protected by a protective tape 37.

The positive electrode 33 has a structure in which positive electrode active material layers 33B are provided on one side or both sides of the positive electrode current collector 33A. The negative electrode 34 has a structure in which negative electrode active material layers 34B are provided on one side or both sides of the negative electrode current collector 34A, and the negative electrode active material layer 34B is disposed so as to face the positive electrode active material layer 33B. The configurations of the positive electrode current collector 33A, the positive electrode active material layer 33B, the negative electrode current collector 34A, the negative electrode active material layer 34B and the separator 35 are similar to those of the positive electrode current collector 21A, the positive electrode active material layer 21B, the negative electrode current collector 22A, the negative electrode active material layer 22B and the separator 23 in the second exemplary embodiment, respectively.

The electrolyte layer 36 contains an electrolysis solution and a polymer compound which is a retention body retaining the electrolysis solution, and is in a so-called gel form. The gel-form electrolyte layer 36 is preferable to be able to attain high ion conductivity and prevent leakage in the battery. The electrolysis solution is the electrolysis solution according to the second exemplary embodiment. Examples of the polymer compound include, for example, polyacrilonitrile, polyvinylidene fluoride, copolymer of polyvinylidene fluoride and polyhexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, a styrene-butadiene rubber, a nitrile-butadiene rubber, polystyrene and polycarbonate. Particularly, in view of electrochemical stability, polyacrilonitrile, polyvinylidene fluoride, polyhexafluoropropylene or polyethylene oxide is preferable.

The electrolyte layer 36 may contain inorganic particles. Because this can improve the heat resistance. The inorganic particles may be ones equivalent to the inorganic particles contained in the surface layer of the separator 23 in the second exemplary embodiment. Moreover, an electrolysis solution may be used instead of the electrolyte layer 36.

The following will show an example of a method for manufacturing the battery according to the third exemplary embodiment of the present disclosure.

A precursor solution including a solvent, an electrolyte salt, a polymer compound, and a mixed solvent is applied on surfaces of each of the positive electrode 33 and the negative electrode 34, and the mixed solvent is then volatilized to form the electrolyte layer 36. Next, the positive electrode lead 31 is welded to the end of the positive electrode current collector 33A, and the negative electrode lead 32 is welded to the end of the negative electrode current collector 34A. Subsequently, the positive electrode 33 and the negative electrode 34 each having the electrolyte layer 36 formed thereon are laminated with the separator 35 interposed therebetween to form a laminate. Then the laminate is wound in a longitudinal direction thereof and the protective tape 37 is adhered to an outermost peripheral portion to form the wound electrode assembly 30. Finally, for example, the wound electrode assembly 30 is interposed between the exterior housing members 40, and the outer edge portions of the exterior housing members 40 are adhered to each other by means of heat fusion or the like, thereby enclosing the wound electrode assembly 30 therein. On that occasion, the adhesion film 41 is inserted between each of the positive electrode lead 31 and the negative electrode lead 32, and the exterior housing member 40. There is thus obtained a battery shown in FIGS. 4 and 5.

Alternatively, the battery may be produced as follows. First of all, in the above-described manner, the positive electrode 33 and the negative electrode 34 are produced, and the positive electrode lead 31 and the negative electrode lead 32 are attached to the positive electrode 33 and the negative electrode 34, respectively. After that, the positive electrode 33 and the negative electrode 34 are laminated with the separator 35 interposed therebetween, the laminate is wound, and the protective tape 37 is adhered to an outermost peripheral portion, thereby forming a wound body. Next, the wound body is interposed between the exterior housing members 40, the outer peripheral edge portions except for one side are adhered to each other by heat fusion to make a bag form, and the wound electrode assembly 30 is housed in the inside of the exterior housing member 40. Subsequently, an electrolyte composite including, a solvent, an electrolyte salt, a monomer which is a raw material of a polymer compound, a polymerization initiator, and another material such as a polymerization inhibitor as necessary is prepared and injected into the exterior housing member 40.

Next, the opening part of the exterior housing member 40 undergoes thermal fusion under a vacuum atmosphere to be sealed after the electrolyte composite is injected into the exterior housing member 40. Next, the monomer is polymerized by heating to be a polymer compound, to form the gel-form electrolyte layer 36. As above, the battery shown in FIGS. 4 and 5 is obtained.

Application Example 1 describes a battery pack and an electronic device including a battery according to the second or third exemplary embodiment.

Figure 6:
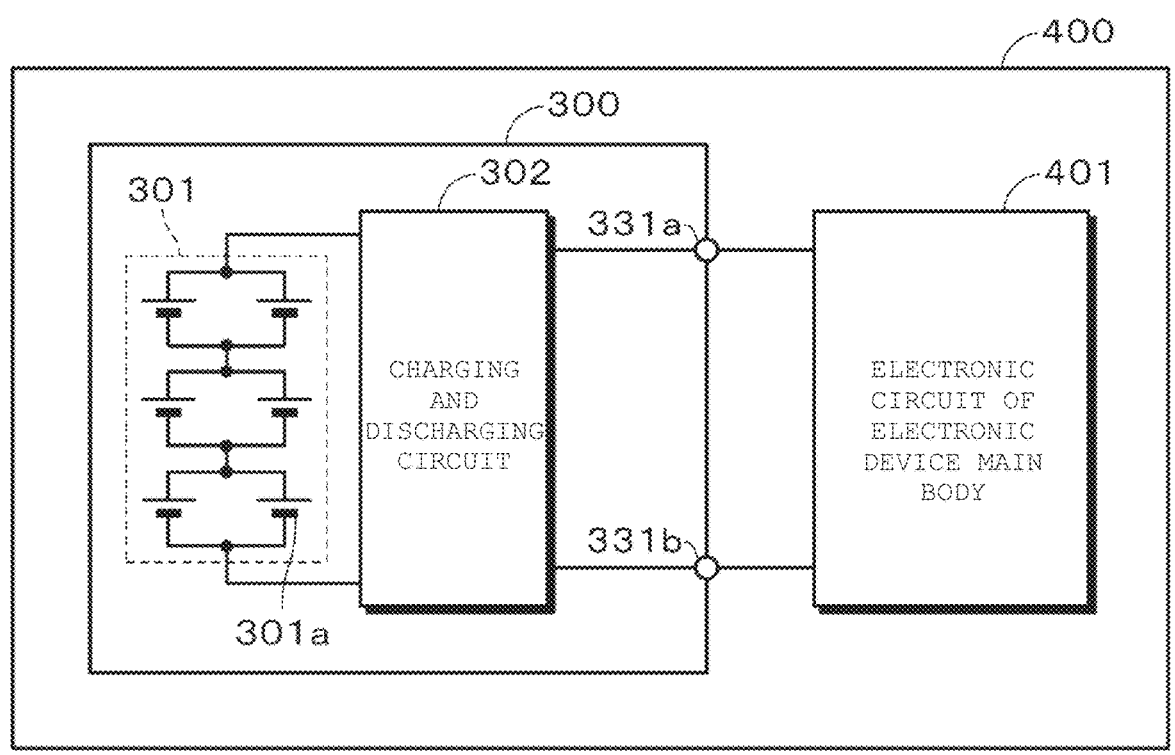
FIG. 6 is a block diagram illustrating one example of a configuration of an electronic device as one application example according to an embodiment of the present disclosure.

A configuration example of a battery pack 300 and an electronic device 400 as an application example will be described below with reference to FIG. 6. The electronic device 400 includes an electronic circuit 401 of an electronic device main body and the battery pack 300. The battery pack 300 is electrically connected to the electronic circuit 401 with a positive electrode terminal 331a and a negative electrode terminal 331b interposed therebetween. The electronic device 400 has, for example, a configuration in which the battery pack 300 is detachable by a user. However, the configuration of the electronic device 400 is not limited thereto, and a configuration in which the battery pack 300 is built in the electronic device 400 so that the user is unable to remove the battery pack 300 from the electronic device 400 may be used.

When the battery pack 300 is charged, the positive electrode terminal 331a and the negative electrode terminal 331b of the battery pack 300 are connected to a positive electrode terminal and a negative electrode terminal of a charger (not shown), respectively. On the other hand, when the battery pack 300 is discharged (when the electronic device 400 is used), the positive electrode terminal 331a and the negative electrode terminal 331b of the battery pack 300 are connected to a positive electrode terminal and a negative electrode terminal of the electronic circuit 401, respectively.

Examples of the electronic device 400 include a notebook personal computer, a tablet computer, a mobile phone (for example, a smartphone), a personal digital assistant (PDA), a display device (for example, an LCD, an EL display, an electronic paper), an imaging device (for example, a digital still camera and a digital video camera), an audio device (for example, a portable audio player), a game device, a cordless phone extension unit, an E-book, an electronic dictionary, a radio, a headphone, a navigation system, a memory card, a pacemaker, a hearing aid, an electric tool, an electric shaver, a refrigerator, an air conditioner, a TV, a stereo, a water heater, a microwave, a dishwasher, a washing machine, a dryer, a lighting device, a toy, a medical device, a robot, a load conditioner, and a traffic light, and the present technology is not limited thereto.

The electronic circuit 401 includes, for example, a CPU, a peripheral logic unit, an interface unit, and a storage unit, and controls the entire electronic device 400.

The battery pack 300 includes an assembled battery 301 and a charging and discharging circuit 302. The assembled battery 301 includes a plurality of secondary batteries 301a that are connected in series and/or parallel. The plurality of secondary batteries 301a are connected, for example, in n parallel m series (n and m are positive integers). In addition, FIG. 6 shows an example in which six secondary batteries 301a are connected in 2 parallel 3 series (2P3S). As the secondary battery 301a, the battery according to the second or third exemplary embodiment is used.

Here, a case where the battery pack 300 includes an assembled battery 301 including a plurality of secondary batteries 301a will be described. However, the battery pack 300 may include a single secondary battery 301a instead of the assembled battery 301.

The charging and discharging circuit 302 is a control unit (controller) configured to control charging and discharging of the assembled battery 301. More specifically, when charging, the charging and discharging circuit 302 controls the charging of the assembled battery 301. On the other hand, when discharging (that is, when the electronic device 400 is in use), the charging and discharging circuit 302 controls the discharging to the electronic device 400.

Figure 7:
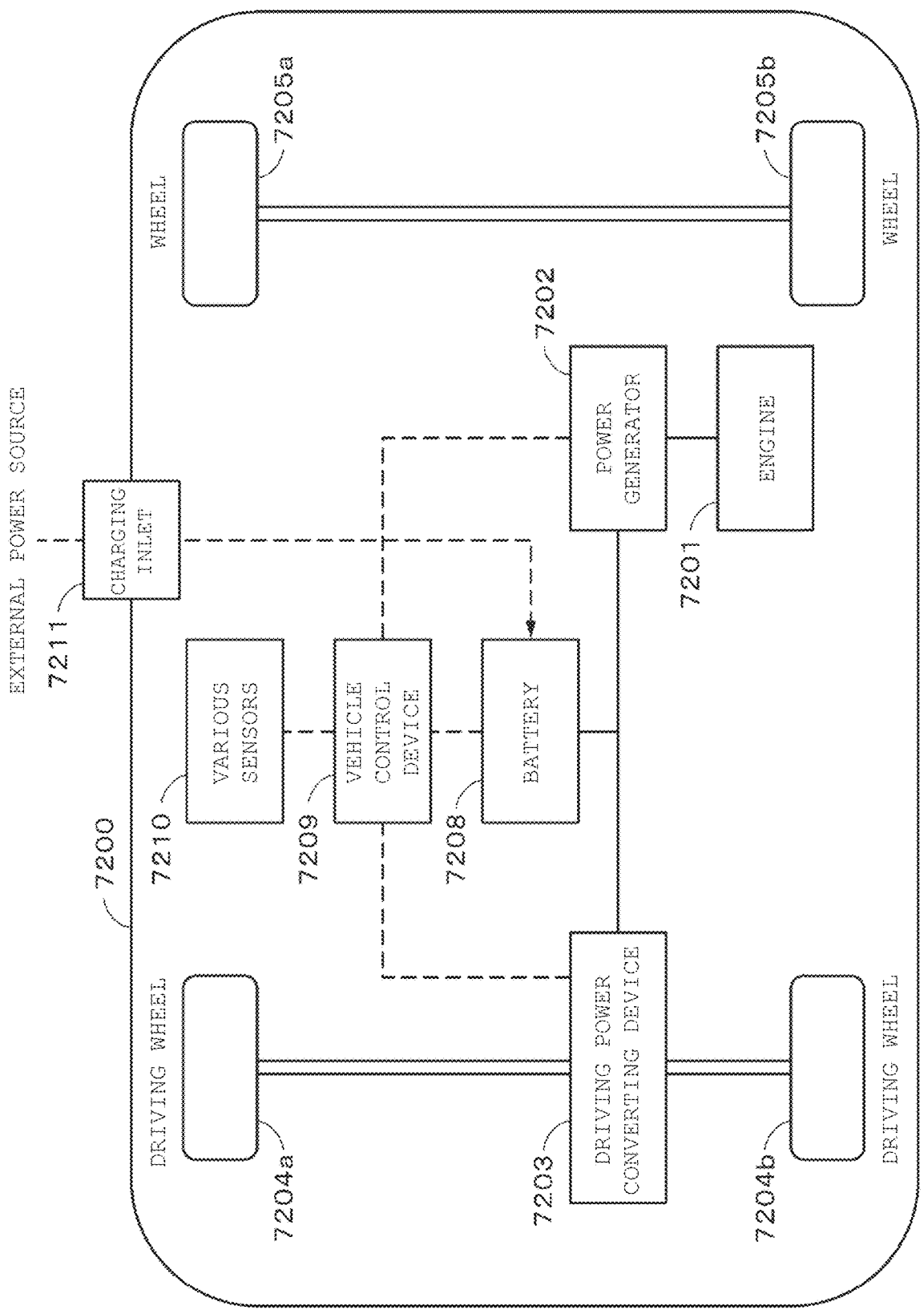
FIG. 7 is a schematic view illustrating one example of a configuration of a vehicle as one application example according to an embodiment of the present disclosure.

A case where the present disclosure is applied in a power storage system for a vehicle will be described, referring to FIG. 7. FIG. 7 schematically illustrates one example of a configuration of a hybrid vehicle in which a series hybrid system to which the present disclosure is applied is adopted. The series hybrid system is a vehicle that uses power generated by a power generator that is moved by an engine or power that is generated by a power generator and stored temporarily in a battery and is operated by a driving power converting device.

A hybrid vehicle 7200 incorporates an engine 7201, a power generator 7202, the driving power converting device 7203, driving wheels 7204a and 7204b, wheels 7205a and 7205b, a battery 7208, a vehicle control device 7209, various sensors 7210, and a charging inlet 7211. For the battery 7208, the power storage device according to the present disclosure described above is applied.

The hybrid vehicle 7200 runs by using the driving power converting device (converter) 7203 as a power source. One of examples of the driving power converting device 7203 is a motor. Power in the battery 7208 drives the driving power converting device 7203, and the rotating power of the driving power converting device 7203 is transmitted to the driving wheels 7204a and 7204b. Note that by using DC/AC conversion or AC/DC conversion in a necessary portion, an alternate current motor or a direct current motor can be used for the driving power converting device 7203. The various sensors 7210 control the number of engine rotation via the vehicle control device 7209 and controls the aperture (throttle aperture) of a throttle valve not shown. The various sensors 7210 include a speed sensor, an acceleration sensor, a sensor of the number of engine rotation, and the like.

The rotating power of the engine 7201 is transmitted to the power generator 7202, and power generated by the power generator 7202 with the rotating power can be accumulated in the battery 7208.

When the hybrid vehicle reduces the speed with a brake mechanism not shown, the resisting power at the time of the speed reduction is added to the driving power converting device 7203 as the rotating power, and regenerative power generated by the driving power converting device 7203 with this rotating power is accumulated in the battery 7208.

The battery 7208 is connected to a power source outside the hybrid vehicle, receives power supply from the external power source using the charging inlet 211 as an input port, and can accumulate the received power.

Although not shown, an information processing device which performs information processing about vehicle control based on information about the secondary battery may be provided. Examples of such an information processing device include an information processing device which displays the remaining battery based on information about the remaining battery.

It should understood that the above description is made by taking an example of the series hybrid car which runs with a motor using power generated by a power generator driven by an engine or the power accumulated in a battery. However, an embodiment of the present disclosure can also be applied effectively to a parallel hybrid car which uses the output of an engine and a motor as the driving power source and switches three modes as appropriate: driving with the engine only; driving with the motor only; and driving with the engine and the motor. Further, an embodiment of the present disclosure can also be applied effectively to a so-called electric vehicle which runs by being driven with a driving motor only, without an engine.

So far, one example of the hybrid vehicle 7200 to which the technique according to the present disclosure is applicable has been described. The technique according to the present disclosure is suitably applicable in the battery 7208 within the configuration described above.

Figure 8:
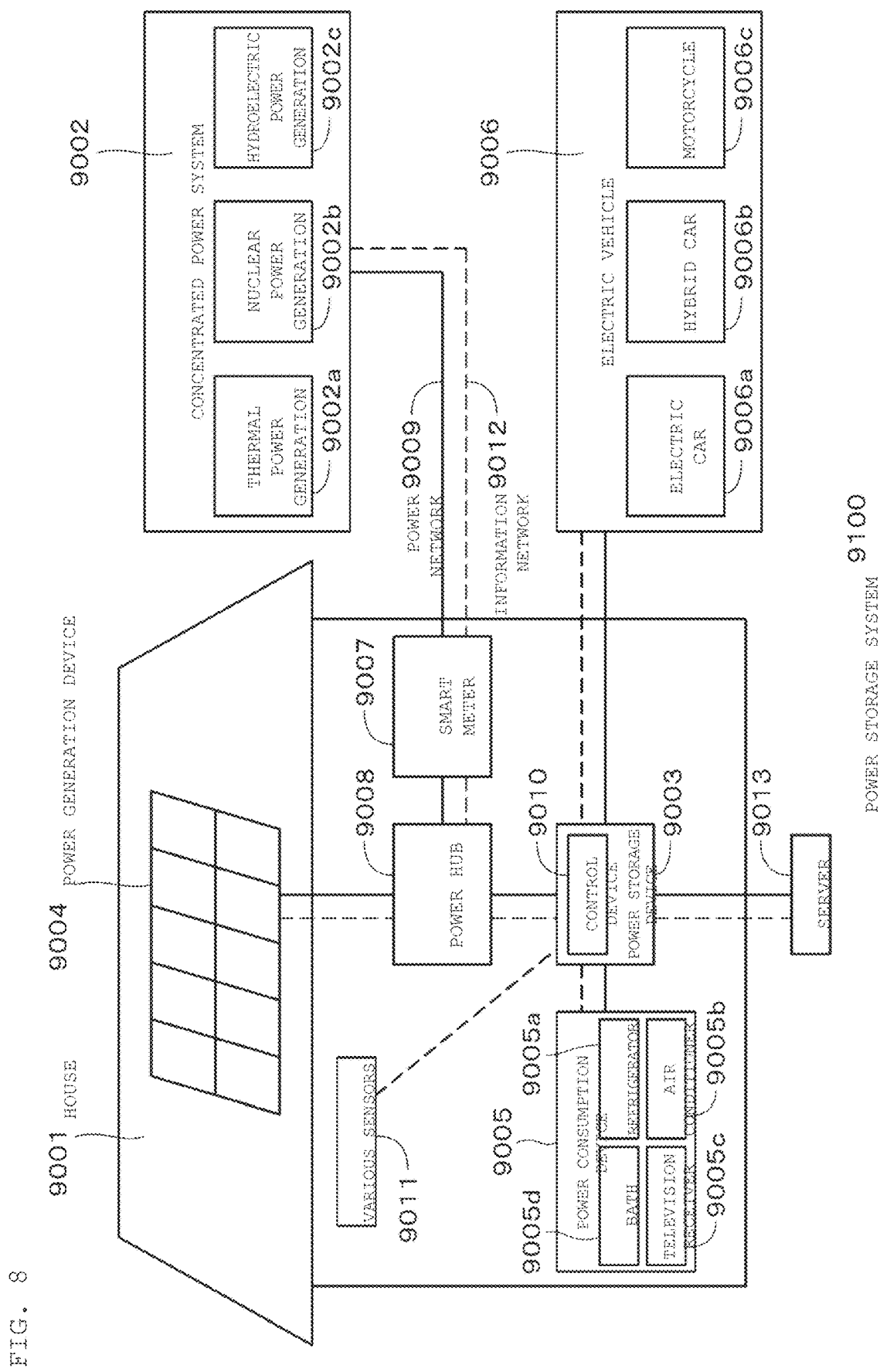
FIG. 8 is a schematic view illustrating one example of a configuration of a power storage system as one application example according to an embodiment of the present disclosure.

"Power Storage System in House as Application Example" An example in which the present disclosure is applied in a power storage system for a residential premise will be described with reference to FIG. 8. For example, in the power storage system 9100 for the house 9001, power is supplied to the power storage device 9003 from a concentrated power system 9002 including thermal power generation 9002a, nuclear power generation 9002b, hydroelectric power generation 9002c, and the like, via a power network 9009, an information network 9012, a smart meter 9007, a power hub 9008, and the like.

Further, power is supplied to the power storage device 9003 from an independent power source such as a home power generation device 9004. Power supplied to the power storage device 9003 is accumulated. Power to be used in the house 9001 is fed with use of the power storage device 9003. The same power storage system can be used not only in the house 9001 but also in a building.

The house 9001 is provided with the power generation device 9004, a power consumption device 9005, the power storage device 9003, a control device (controller) 9010 which controls each device, the smart meter 9007, and sensors 9011 which acquires various pieces of information. The devices are connected to each other by the power network 9009 and the information network 9012. As the power generation device 9004, a solar cell, a fuel cell, or the like is used, and generated power is supplied to the power consumption device 9005 and/or the power storage device 9003. Examples of the power consumption device 9005 include a refrigerator 9005a, an air conditioner 9005b, a television receiver 9005c, a bath 9005d, and the like. Examples of the power consumption device 9005 further include an electric vehicle 9006. The electric vehicle 9006 includes an electric car 9006a, a hybrid car 9006b, or a motorcycle 9006c.

The battery unit according to the present disclosure described above is applied to a power storage device 9003. The power storage device 9003 includes a secondary battery or a capacitor.

For example, it is constituted by a lithium ion battery. The lithium ion battery may be a stationary type or be for use in the electric vehicle 9006. A smart meter 9007 has functions to measure a used amount of a commercial power and transmit the measured amount to an electric power company. A power network 9009 may be for any one of direct current power feeding, alternative current power feeding, or wireless charging, or for a combination of two or more of them.

Examples of the various sensors 9011 include a motion sensor, an illumination sensor, an object detecting sensor, a power consumption sensor, a vibration sensor, a touch sensor, a temperature sensor, an infrared sensor, and the like. Information acquired by the various sensors 9011 is transmitted to the control device 9010. With the information from the sensors 9011, weather conditions, people conditions, and the like are caught, and the power consumption device 9005 is automatically controlled so as to make the energy consumption minimum. Further, the control device 9010 can transmit information about the house 9001 to an external power company via the Internet, for example.

The power hub 9008 performs processes such as branching off power lines and DC/AC conversion. Examples of communication schemes of the information network 9012 connected to the control device 9010 include a method using a communication interface such as UART (Universal Asynchronous Receiver/Transmitter), and a method using a sensor network according to a wireless communication standard such as Bluetooth (registered trademark), ZigBee (registered trademark), or Wi-Fi. A Bluetooth (registered trademark) scheme can be used for multimedia communication, and one-to-many connection communication can be performed. ZigBee (registered trademark) uses a physical layer of IEEE (Institute of Electrical and Electronics Engineers) 802.15.4. IEEE802.15.4 is the name of a near-field wireless network standard called PAN (Personal Area Network) or W (Wireless) PAN.

The control device 9010 is connected to an external server 9013. The server 9013 may be managed by any of the house 9001, an electric company, and a service provider. Examples of information transmitted and received by the server 9013 include, for example, power consumption information, life pattern information, electric fee, weather information, natural disaster information, and information about power trade. Such information may be transmitted and received by the power consumption device (e.g., the television receiver) in the house, or may be transmitted and received by a device (e.g., a mobile phone) outside the house. Further, such information may be displayed on a device having a display function, such as the television receiver, the mobile phone, or the Personal Digital Assistant (PDA).

The control device 9010 controlling each part is configured with a CPU (Central Processing Unit) or a processor, a RAM (Random Access Memory), a ROM (Read Only Memory), and the like, and is stored in the power storage device 9003 in this example. The control device 9010 is connected to the power storage device 9003, the home power generation device 9004, the power consumption device 9005, the various sensors 9011, and the server 9013 via the information network 9012, and has a function of adjusting the used amount of commercial power and the power generation amount, for example. Note that the control device 9010 may further have a function of performing power trade in the power market.

As described above, power generated by not only the concentrated power system 9002 such as the thermal power 9002a, the nuclear power 9002b, and the hydroelectric power 9002c, but also the home power generation device 9004 (solar power generation or wind power generation) can be accumulated in the power storage device 9003.

Therefore, even when the power generated by the home power generation device 9004 varies, the amount of power supplied to the outside can be made constant, or only necessary discharge can be controlled. For example, power generated by the solar power generation can be accumulated in the power storage device 9003 and also inexpensive power at midnight can be accumulated in the power storage device 9003 during nighttime, so that power accumulated in the power storage device 9003 can be discharged and used during daytime when the power fee is expensive.

It should be understood that although this example shows the control device 9010 housed inside the power storage device 9003, the control device 9010 may be housed inside the smart meter 9007 or configured independently. Further, the power storage system 9100 may be used for a plurality of families in a multiple dwelling house or a plurality of separate houses.

So far, one example of the power storage system 9100 to which the technique according to the present disclosure is applicable has been described. The technique according to the present disclosure is suitably applicable to the secondary battery of the power storage device 9003 within the configuration described above.

EXAMPLES

In the following, the present disclosure will be concretely described referring to Examples, but the present disclosure is not limited to these Examples.

Example 1-1

To begin with, Si powder (made by Kojundo Chemical Lab. Co., Ltd.), $SiO_2$ powder (made by Kojundo Chemical Lab. Co., Ltd.), and Cu powder (made by Kojundo Chemical Lab. Co., Ltd.) were measured in a mass ratio of Si powder:$SiO_2$ powder:Cu powder=1:1:0.1, and mixed together to prepare a mixture. Next, the mixture thus prepared in an appropriate amount was added in water as a solvent, and uniformly dispersed by an ultrasonic bath, and thereafter the solvent was dried off, thereby solidifying the mixture. Then, the mixture thus solidified was placed as a vapor deposition source in a vacuum chamber and evaporated by electron beam heating, so that a thin film (film thickness: 9 μm, size: 10 cm×20 cm) was deposited on a Cu foil (vapor deposition substrate) facing to the mixture. The Cu foil was a Cu rough foil in order to prevent film peeling due to charging and discharging. In this way, a thin-film electrode (negative electrode) targeted was obtained.

Example 1-2

A thin film electrode was prepared as in Example 1-1, except that, after the thin film was deposited on the Cu foil, the thin film was subjected to a vacuum heating treatment of 600° C. in an infrared vacuum furnace.

Example 1-3

A thin film electrode was prepared as in Example 1-1, except that, after the thin film was deposited on the Cu foil, the thin film was subjected to a vacuum heating treatment of 800° C. in an infrared vacuum furnace.

Comparative Examples 1-1, 1-2, 1-3

Thin film electrodes were prepared as in Examples 1-1, 1-2, and 1-3, except that the Cu powder was not mixed in.

Comparative Examples 2-1, 2-2, 2-3

Thin film electrodes were prepared as in Examples 1-1, 1-2, 1-3, except that Si powder (made by Kojundo Chemical Lab. Co., Ltd.), $SiO_2$ powder (made by Kojundo Chemical Lab. Co., Ltd.), and Fe powder (made by Kojundo Chemical Lab. Co., Ltd.) were measured in a mass ratio of Si powder:$SiO_2$ powder:Fe powder=1:1:0.1, and mixed together.

Comparative Examples 3-1, 3-2, 3-3

Thin film electrodes were prepared as in Examples 1-1, 1-2, 1-3, except that Si powder (made by Kojundo Chemical Lab. Co., Ltd.), $SiO_2$ powder (made by Kojundo Chemical Lab. Co., Ltd.), and Ni powder (made by Kojundo Chemical Lab. Co., Ltd.) were measured in a mass ratio of Si powder:$SiO_2$ powder:Ni powder=1:1:0.1, and mixed together.

XPS analysis was conducted on the thin-film electrodes of Examples 1-1 and 1-3, Comparative Examples 1-1, 1-3, 2-1, 2-3, 3-1, and 3-3. A measurement device and measurement conditions herein were as follows.

Device: JEOL JPS9010

Measurement: Wide scanning, narrow scanning (Si2p, C1s, O1s, Cu2p)

All the peaks were calibrated with reference to 248.4 eV of C1s, and the bonding states were analyzed with background removal and peak fitting.

Scanning electron microscope (SEM) analysis was conducted on the thin-film electrodes of Examples 1-1 and 1-3. A measurement device and measurement conditions herein were as follows.

Device: Hitachi High-Tech s-4800

Measurement: Surface observation (acceleration voltage 5 kV), EDX (energy dispersive X-ray spectroscopy) measurement (acceleration voltage 15 kV)

Transmission electron microscope (TEM) analysis was conducted on the thin-film electrode of Example 1-1. A measurement device and measurement conditions herein were as follows.

Device: JEOL JEM-ARM 300F

Measurement: accelerating voltage 300 kV, bright-field image

For thinning the sample, a focused ion beam was used. Moreover, to obtain average information of the thin-film electrode, TEM images of randomly-selected five viewing fields of each of a vicinity of a surface of the electrode and a vicinity of a depth of 200 nm from the surface were captured.

Coil-type half cells (hereinafter, referred to as "coil cells") with 2016 size (a size with a diameter of 20 mm and a height of 1.6 mm) in which the thin-film electrodes (negative electrodes) of Examples 1-1 to 1-3, and Comparative Examples 1-1 to 3-3 were provided as a working electrode, respectively, and a lithium metal foil was provided as a counter electrode, were prepared as below.

To begin with, the thin-film electrode (negative electrode) was punched into a circle of 15 mm in diameter. Next, a lithium metal foil punched into a circle of 15 mm in diameter as the counter electrode and a microporous film made from polyethylene as a separator were provided. Next, into a solvent in which ethylene carbonate (EC), fluoroethylene carbonate (FEC), and dimethyl carbonate (DMC) were mixed in a mass ratio of EC:FEC:DMC=40:10:50, $LiPF_6$ was dissolved as an electrolyte salt to make up a concentration of 1 mol/kg, thereby preparing a non-aqueous electrolyte solution.

Next, the positive electrode and the negative electrode were laminated with the microporous film therebetween, thereby preparing a laminate, and the laminate and the non-aqueous electrolyte solution were accommodated inside an external housing cup and an external housing can, and the external housing can was crimped with a gasket. In this way, a coil cell as targeted was prepared.

(Initial Charging and Discharging Capacity, Initial Charging and Discharging Efficiency, and Initial Impedance)

To being with, the coil cell thus prepared was charged and discharged under the following conditions, to work out the initial charging and discharging capacity and the initial charging and discharging efficiency.

Charge 0V CCCV(Constant Current/Constant Voltage) 0.05 C (0.04 mA cut)

Discharge 1.5V CC (Constant Current) 0.05 C

Next, the initial charging and discharging efficiency was worked out from the following equation.

Initial charging and discharging efficiency [%]=(Initial discharging capacity/initial charging capacity)×100

Furthermore, alternative impedance was measured at a room temperature of 25° C. after the initial discharging, and Cole-Cole plotting was created, thereby working out an initial impedance. Note that the initial impedances on Table 1 are values at the frequency of 1 kHz.

(Cycle Property, Post-Discharging OCV)

To being with, the coin cells thus prepared were charged and discharged to work out discharging capacities at 1st cycle and 50th cycles.

1st cycle: Charge 0V CCCV 0.05 C (0.04 mA cut), Discharge 1.5V CC 0.05 C

After 2nd Cycle: Charge 0V CCCV 0.5 C (0.04 mA cut), Discharge 1.5V CC 0.5 C

Next, the cycle property was worked out from the following equation.

Cycle property [%]=(discharging capacity at 50th cycle/discharging capacity at 1st cycle)×100

Moreover, open circuit voltage was measured after the 50 cycles of discharging.

Firstly, the concept of the pre-doping of the second element will be discussed. The second element for pre-doping should be selected in consideration of two factors, namely, (1) element dispersion inside $SiO_x$ and (2) the reaction between the oxygen site and the element.

Figure 9:
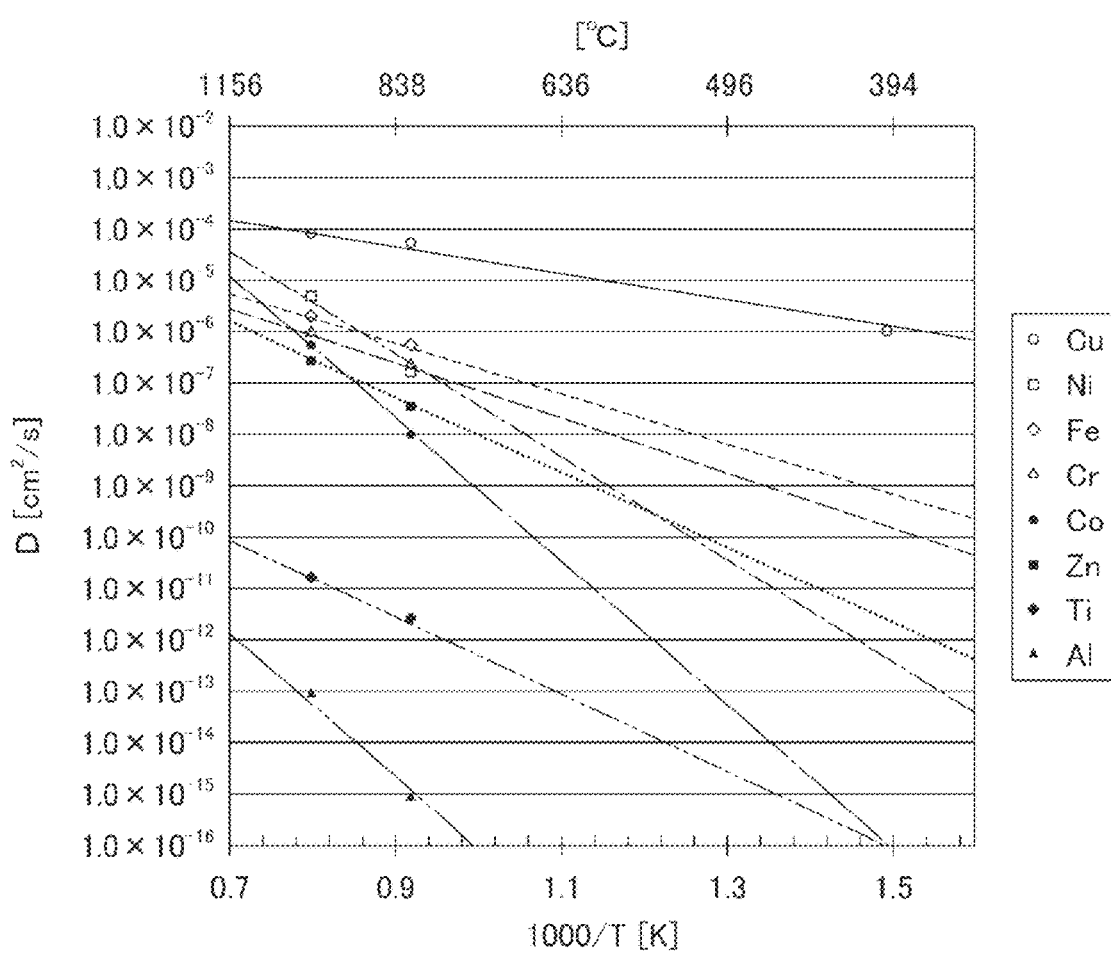
FIG. 9 is a graph illustrating a relationship between dispersion speeds of elements in Si and temperature according to an embodiment of the present disclosure.

Regarding (1), an element being dispersible in Si and $SiO_2$ is necessary, and as illustrated in FIG. 9, it can be said that Cu is one of potential candidates. Dispersibility of Cu in Si is 100 times to 1000 times greater than that of Fe described in Patent Document 2, and it is known that the dispersibility of Cu in $SiO_2$ is high. Moreover, in the technique in which Fe is post-added from the surface of $SiO_x$ (thermal dispersion reaction), element dispersion inside $SiO_x$ is difficult. On the other hand, the co-vapor deposition adopted in the present Examples is a technique in which the elements are added at the same time of forming $SiO_x$, and therefore is capable of uniformly adding the element to the inside.

Regarding (2), in general, Cu is difficult to react with the oxygen site, but in the case of $SiO_x$, which a highly non-stoichiometric material with high oxygen reactivity, the possibility of forming Cu—O bonding cannot be denied. Thus, in the present Examples, as described above, Cu was selected as the element to add for preparing the vapor-deposited film.

Figure 10A:
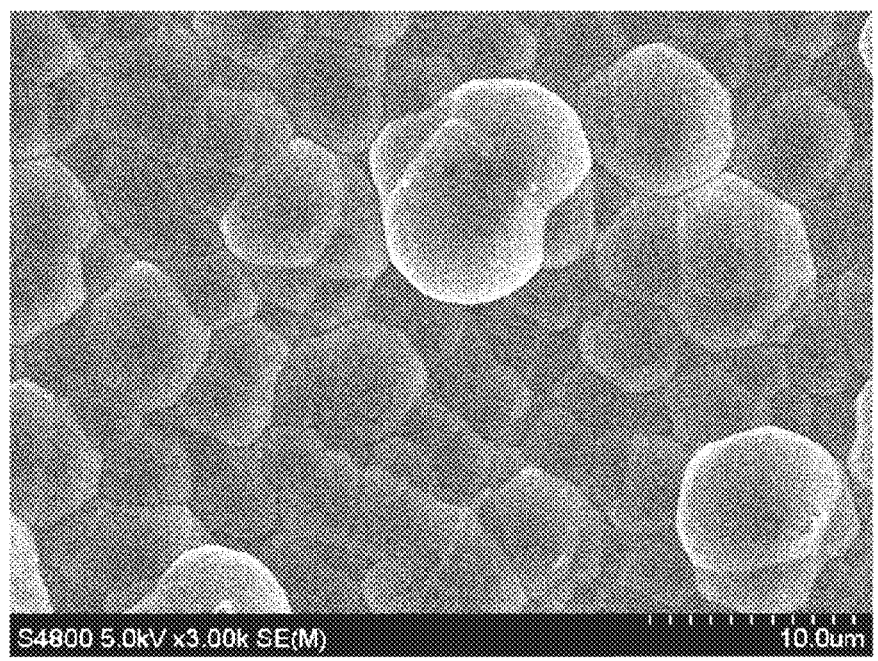
FIG. 10A is a surface scanning electron microscope (SEM) image of a vapor-deposited film (Example 1-1) without heat treatment according to an embodiment of the present disclosure.
Figure 10B:
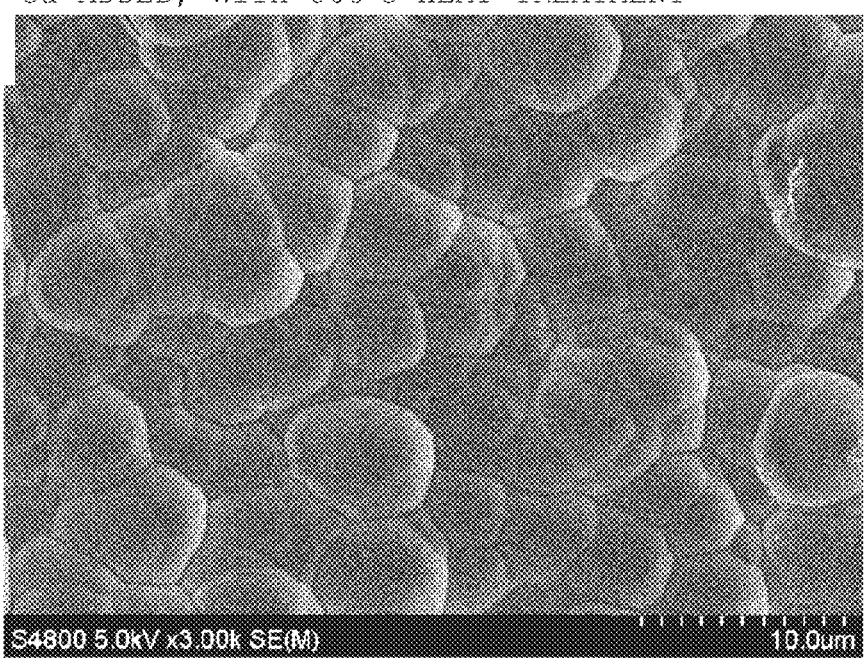
FIG. 10B is a surface SEM image of a vapor-deposited film (Example 1-3) with heat treatment of 800° C. according to an embodiment of the present disclosure.

FIG. 10A is a surface SEM image of a vapor-deposited film (Example 1-1) without heat treatment. FIG. 10B shows a surface SEM image of a vapor-deposited film (Example 1-3) with heat treatment of 800° C. Grain structures of 2 to 10 μm are observed therein, being deposited as column structures on Cu. The compositional ratios are Si:O:Cu=47:42:11 wt % (42.5:52.5:5 at %) without the heat treatment, and Si:O:Cu=50:38:12 wt % (41.7:54.6:3.7 at %) with the heat treatment of 800° C., and the amounts of Cu added were approximate to the feed compositions (feed Cu concentration: 10 wt % (3.5 at %). Moreover, EDX mapping confirmed that there was no Cu precipitation on the surface with or without the heat treatment.

Table 1 shows the preparation conditions and evaluation results of the thin-film electrodes of Examples 1-1 to 1-3 and Comparative Examples 1-1 to 3-3.

TABLE I

| | Vapor deposition source material | Heat treatment temperature (° C.) | XPS composition (inside) (at %) | Initial charging and discharging efficiency (%) | Initial impedance (Ω) | Initial charging capacity (mAh/g) | Cycle property (%) | Post-discharged OCV (V) |
|---|---|---|---|---|---|---|---|---|
| Example 1-1 | Si, SiO$_2$, Cu | RT | Si:O:Cu = 42.5:52.5:5 | 72.1 | 35 | 2130 | 97 | 1.7 |
| Example 1-2 | | 600 | — | 73.9 | 19.8 | 1970 | — | — |
| Example 1-3 | | 800 | Si:O:Cu = 41.7:54.6:3.7 | 73.8 | 23.6 | 1800 | 95 | 1.7 |
| Comparative Example 1-1 | Si, SiO$_2$ | RT | Si:O = 38.8:61.2 | 43.7 | 87.5 | 2420 | 55 | 0.5 |
| Comparative Example 1-2 | | 600 | — | 59.9 | 50.4 | 2270 | — | — |
| Comparative Example 1-3 | | 800 | Si:O = 45.8:54.2 | 68.5 | 46.6 | 2270 | 43 | 0.7 |
| Comparative Example 2-1 | Si, SiO$_2$, Fe | RT | Si:O:Fe = 38.9:57.8:3.3 | 58.2 | 49.1 | 2300 | — | — |
| Comparative Example 2-2 | | 600 | — | 71.9 | 21.1 | 2230 | — | — |
| Comparative Example 2-3 | | 800 | Si:O:Fe = 43.6:52.9:3.5 | 71.9 | 34.2 | 2190 | 42 | 0.8 |
| Comparative Example 3-1 | Si, SiO$_2$, Ni | RT | Si:O:Ni = 43.5:55:1.5 | 58.5 | 41.5 | 2240 | — | — |
| Comparative Example 3-2 | | 600 | — | 70.4 | 23.8 | 2070 | — | — |
| Comparative Example 3-3 | | 800 | Si:O:Ni = 43.4:55.3:1.3 | 68.4 | 20.9 | 1880 | 95 | 1.6 |

RT: room temperature (without heat treatment)
OCV: Open Circuit Voltage

To determine the element compositional ratios more accurately, XPS depth analysis was conducted to find that the element compositional ratios inside the thin film were substantially equivalent to the results of EDX. The initial charging and discharging efficiency of the not-added thin film was improved to 68.5% from 43.7% by the heat treatment of 800° C., but the O/Si ratio was decreased, which was suspected as being caused by reduction by the heat treatment. However, the O/Si ratio of the thin film with the heat treatment of 800° C. was 1.18, which is equivalent to the general $SiO_x$ material. Thus, the not-added thin film and the heat treatment were excess in oxygen (O/Si ratio: 1.58). On the other hand, the initial charging and discharging efficiency of the Cu-added thin film was as high as 72.1% even without the heat treatment. The oxygen ratio of the Cu-added thin-film without the heat treatment was substantially equivalent to the not-added thin film but with the heat treatment of 800° C. (O/Si ratio: 1.24). The approximately 4% improvement in the initial charging and discharging efficiency (the improvement of the initial charging and discharging efficiency with respect to the not-added thin film and the heat treatment of 800° C.) accords with the amount of Cu added. Thus, it is deduced that this is an effect of the Cu addition. Moreover, the compositional ratio and the initial charging and discharging efficiency of the Cu-added thin film showed no significant changes with the heat treatment, and this demonstrates that oxygen and Cu are stabilized inside the bulk.

Furthermore, the 2.5 V discharging cycle property of the Cu-added thin film was significantly more improved than the not-added thin film (improved from 55% to 97%). In general, the 2.5 V discharging of $SiO_x$ breaks the non-stoichiometric Si—O bonding (which is weaker than $SiO_2$), which extremely deteriorates the cycle property. Considering this, it is deduced that the Cu addition reinforces the Si—O bonding.

Figure 11A:
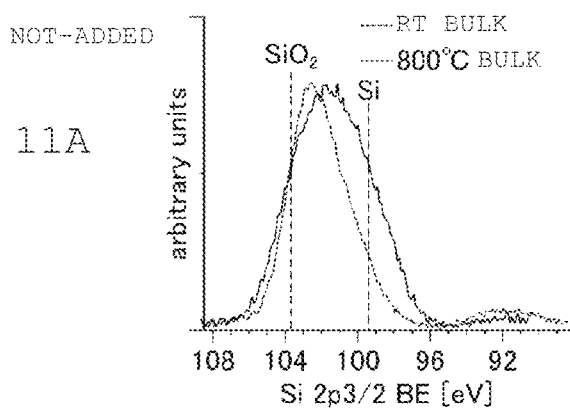
FIG. 11A is a graph illustrating X-ray photoelectron spectroscopy (XPS) spectrums of insides of vapor-deposited films (Comparative Examples 1-1 and 1-3) without a second element added thereto according to an embodiment of the present disclosure.
Figure 11B:
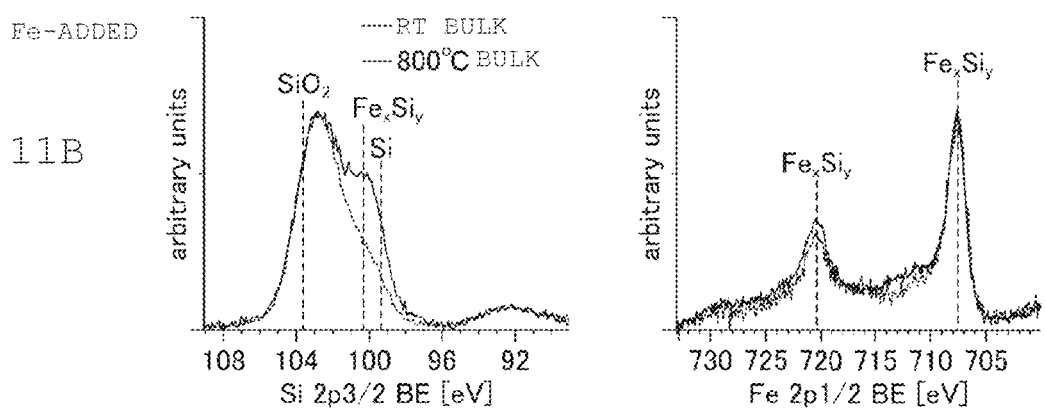
FIG. 11B is a graph illustrating XPS spectrums of insides of vapor-deposited films (Comparative Examples 2-1 and 2-3) with Fe added thereto as a second element according to an embodiment of the present disclosure.
Figure 11C:
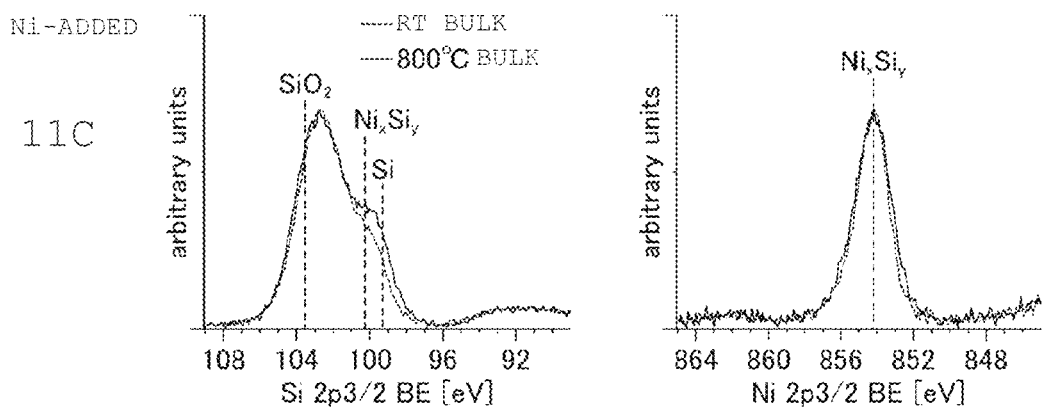
FIG. 11C is a graph illustrating XPS spectrums of insides of vapor-deposited films (Comparative Examples 3-1 and 3-3) with Ni added thereto as a second element according to an embodiment of the present disclosure.
Figure 11D:
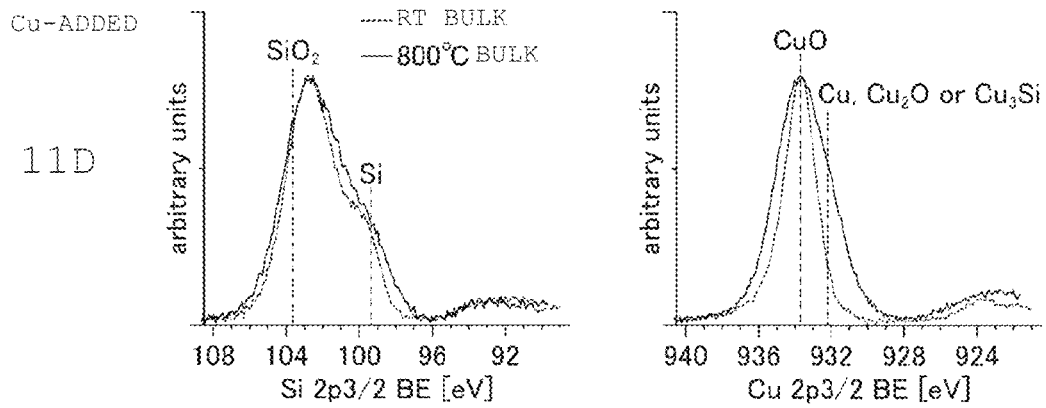
FIG. 11D is a graph illustrating XPS spectrums of insides of vapor-deposited films (Examples 1-1 and 1-3) with Cu added thereto as a second element according to an embodiment of the present disclosure.
Figure 12A:
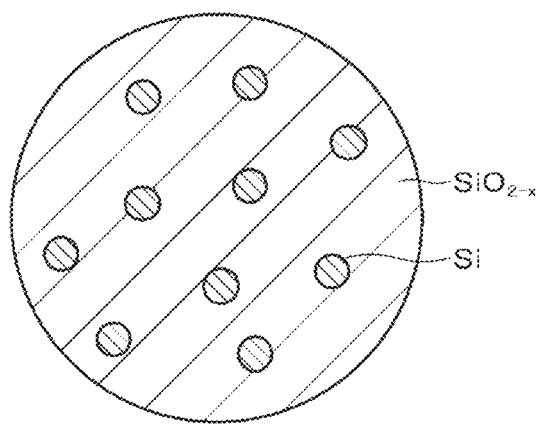
FIG. 12A is a conceptual view illustrating an internal structure of a vapor-deposited film (Comparative Example 1-1) without a second element added thereto according to an embodiment of the present disclosure.
Figure 12B:
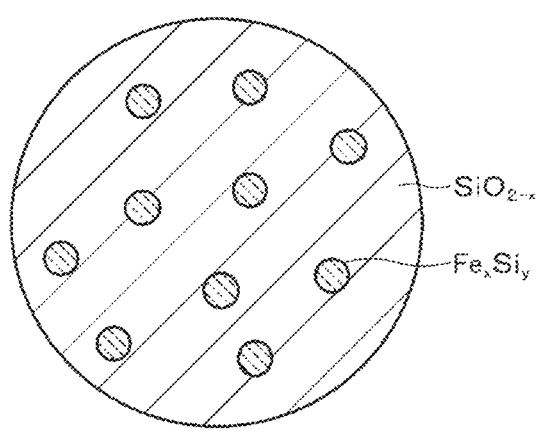
FIG. 12B is a conceptual view illustrating an internal structure of a vapor-deposited film (Comparative Example 2-1) with Fe added thereto as a second element according to an embodiment of the present disclosure.
Figure 12C:
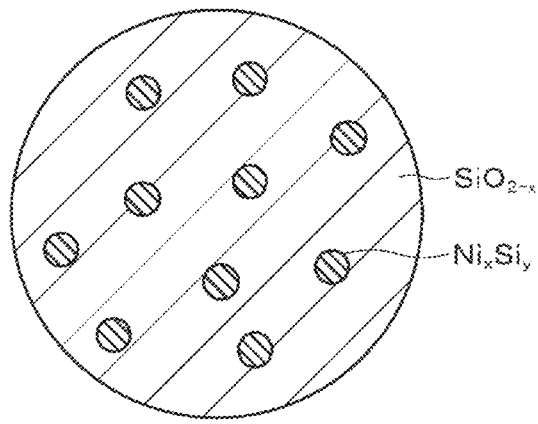
FIG. 12C is a conceptual view illustrating an internal structure of a vapor-deposited film (Comparative Example 3-1) with Ni added thereto as a second element according to an embodiment of the present disclosure.
Figure 12D:
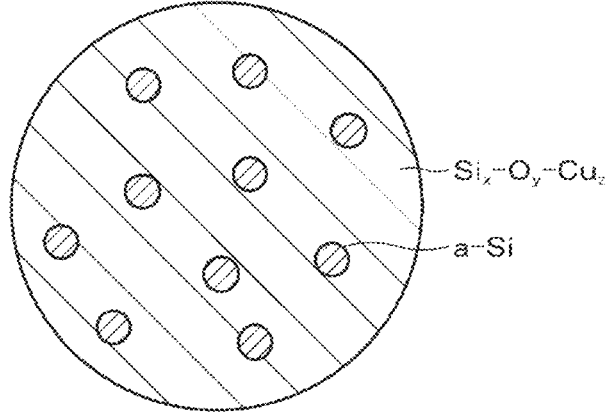
FIG. 12D is a conceptual view illustrating an internal structure of a vapor-deposited film (Example 1-1) with Cu added thereto as a second element according to an embodiment of the present disclosure.

FIGS. 11A and 12A are XPS spectrums and structural conceptual views of the inside of the not-added thin film of the second element. FIG. 11B, 11C, 11D, 12B, 12C, and 12D are XPS spectrums and structural conceptual views of the inside of the thin films with Fe, Ni, or Cu added thereto as the second element. In FIGS. 11A, 11B, 11C, and 11D, RT stands for room temperature, and more specifically, indicates the sample without the heat treatment. Moreover, the structural conceptual views of FIGS. 12A, 12B, 12C, and 12D regard the sample without the heat treatment.

It can be understood that, in the case of the not-added thin film, the heat treatment decreases the $SiO_2$ content and increases the Si content. That is, it can be deduced that the structure of the not-added thin film is a structure in which nano Si is dispersed in the matrix of the $SiO_{2-x}$. In the case of an Fe or Ni-added thin film, the heat treatment does not change the $SiO_2$ content, but increases the Si content and the silicide content. Fe2P and Ni2p indicate that they were Fe silicide and Ni silicide, respectively, and the heat treatment did not make any change. Thus, it is deduced that they had been already become silicide at the time of the thin film formation. Thus, it is deduced that the structures of the Fe or Ni-added thin film is a structure in which nano silicide is dispersed in the matrix of $SiO_{2-x}$. In the Fe or Ni-added film, the initial charging and discharging efficiency was not improved, and therefore, it is deduced that the added element was not bonded with oxygen therein. On the other hand, the Cu-added thin film, whose initial charging and discharging efficiency was improved, unlike the Fe or Ni-added thin film, showed no change in the Si state with the heat treatment, and it was also found that Cu was present as CuO, but not Cu metal, Cu silicide, or $Cu_2O$. That is, it was confirmed that Cu was bonded with oxygen.

Figure 13A:
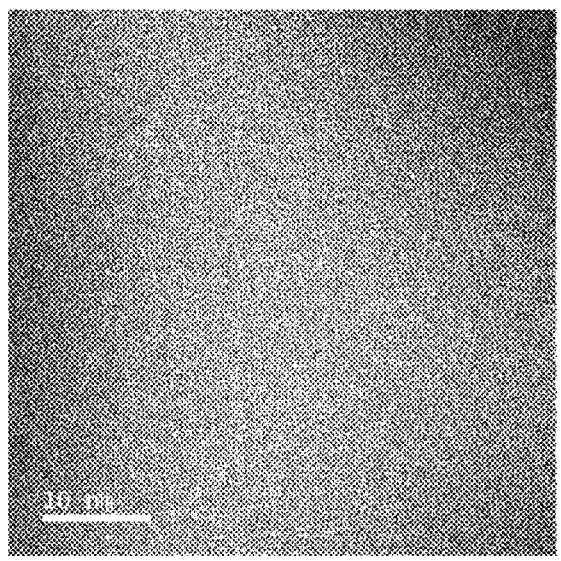
FIG. 13A is a transmission electron microscopy (TEM) image of a vapor-deposited film (Example 1-1) with Cu added thereto as a second element according to an embodiment of the present disclosure.
Figure 13B:
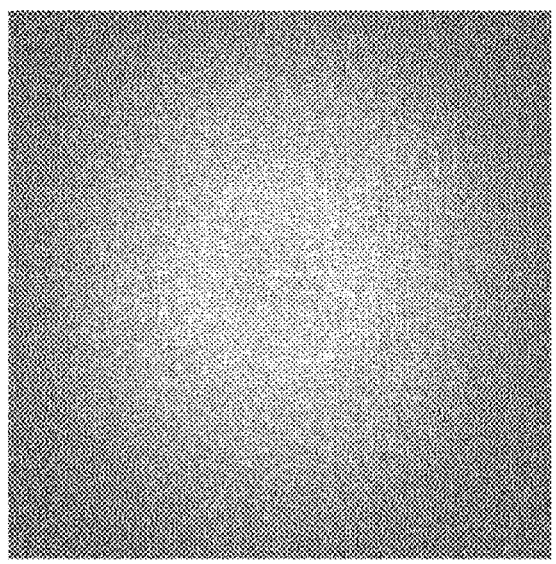
FIG. 13B is a fast Fourier transformation (FFT) image of the TEM image of FIG. 13A.
Figure 13B:
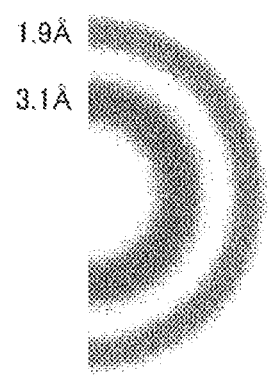

FIGS. 13A and 13B illustrate a TEM image and FFT image of the Cu-added thin film electrode (without the heat treatment). The TEM observation was conducted at ten points randomly selected, but an amorphous state was observed at all of the points, and no crystalline material was observed thereat. Amorphous Si clusters of 1 to 2 nm were observed but none of Cu metal, Cu silicide, and Cu silicate was found, which accords with the analysis results of the XPS of FIG. 11D.

Even though the Examples described above described the case where silicon is used as the first element, but germanium and tin are also Group 14 elements and therefore have similar properties as negative electrode active materials. Moreover, germanium oxide and tin oxide are also capable of forming a non-stoichiometric structure similar to that of silicon oxide. Therefore, it can be deduced that the use of germanium or tin as the first element could attain effects similar to those attainable by the use of silicon as the first element. Moreover, it is also deduced that use of two or more of silicon, germanium, and tin in combination as the first elements could attain effects similar to those attainable by the sole use of silicon, germanium, or tin as the first element.

Moreover, even though the Examples described above describes the case where cupper is used as the second element, boron, phosphorous, aluminum, gallium, arsenic, antimony, and sodium are, similarly to copper, also reactive with oxygen (that is, capable of forming an oxide), and are dispersible in the first element and the first element oxide. Therefore, it is deduced that the use of boron, phosphorous, aluminum, gallium, arsenic, antimony, or sodium as the first element could attain effects similar to those attainable by the use of copper as the first element. Moreover, it is deduced that the use of two or more of copper, boron, phosphorous, aluminum, gallium, arsenic, antimony, and sodium in combination as the second elements could attain effects similar to those attainable by the sole use of copper, boron, phosphorous, aluminum, gallium, arsenic, antimony, or sodium as the second element.

The embodiments, modifications thereof, and examples of the present disclosure have been specifically described above. However, the present disclosure is not limited to the above-described embodiments, modifications thereof, and examples. Various modifications of the present technology can be made without departing from the technical spirit of the present disclosure.

For example, the configurations, the methods, the processes, the shapes, the materials, the numerical values, and the like mentioned in the above-described embodiments, modifications thereof, and examples are merely examples. Different configurations, methods, processes, shapes, materials, numerical values, and the like may be used, as necessary. In addition, chemical formulas of compounds and the like are representative, and the general names of the same compounds are not limited to the described valence.

Further, configuration, methods, processes, shapes, materials, numerical values and the like in the above-described embodiments, modifications thereof, and examples may be combined insofar as they are not departing from the spirit of the present disclosure.

Moreover, even though the Embodiments and Examples described the examples in which the present disclosure is applied to cylindrical and laminate film-type secondary batteries, the battery is not particularly limited in terms of shape. For example, the present disclosure is also applicable to rectangular-shaped or coin-type secondary batteries and the like, and the present disclosure is also applicable to flexible batteries and the like for use on wearable terminals such as smart watches, head-mount displays, and iGlass (registered trademark).

Even though the Embodiments and Examples described the examples in which the present disclosure is applied to wound secondary batteries, the structure of the battery is not limited to these, and the present disclosure is also applicable to laminate batteries (stack-type batteries) in which a positive electrode and a negative electrode are laminated with a separator therebetween or batteries in which a positive electrode and a negative electrode are folded with a separator therebetween and the like.

Moreover, even though the Embodiments and Examples described the examples in which the present disclosure is applied to the lithium ion secondary batteries and lithium ion polymer secondary batteries, the kinds of battery to which the present disclosure is applicable are not limited to these. For example, the present disclosure may be applied to a solid state battery such as a lithium-ion secondary battery.

Moreover, even though the Embodiments and Examples described the examples in which the present disclosure is applied to the exemplary structures in which the electrode includes the current collector and the active material layer, but the structure of the electrode is not limited to this. For example, the structure may be such that the electrode includes only the active material layer.

In addition, the present disclosure is described below in further detail according an embodiment.

(1)

A negative electrode active material, including:

a matrix including at least one first element selected from the group consisting of silicon, tin, and germanium, at least one second element selected from the group consisting of copper, boron, phosphorous, aluminum, gallium, arsenic, antimony, and sodium, and oxygen, in which the second element bonds with oxygen; and a cluster being dispersed in the matrix and including the at least one first element.

(2)

The negative electrode active material according to (1), in which the matrix includes bonding represented by the following general formula (1):

$$M1\text{-}O\text{-}M2 \qquad (I)$$

(where M1 is the first element and M2 is the second element.)

(3)

The negative electrode active material according to (1) or (2), in which the bonding between the second element and oxygen is covalent bonding.

(4)

The negative electrode active material according to any one of (1) to (3), in which the matrix and the cluster are amorphous.

(5)

The negative electrode active material according to any one of (1) to (4), in which an average size of the cluster is 2 nm or less.

(6)

The negative electrode active material according to any one of (1) to (5), in which the cluster is substantially uniformly distributed in the whole matrix.

(7)

The negative electrode active material according to any one of (1) to (6), in which the first element includes silicon, the second element includes cupper, a Cu2p waveform obtainable by X-ray photoelectron spectroscopy does not have a peak top in a range of bonding energy not less than 931 eV but less than 933 eV, but has a peak top in a range of bonding energy not less than 933 eV but not more than 935 eV.

(8)

The negative electrode active material according to (7), in which a peak having the peak top in the range of bonding energy not less than 933 eV but not more than 935 eV is a peak attributing to Cu—O or Si—O—Cu.

(9)

The negative electrode active material according to any one of (1) to (8), substantially not including: a first compound in which the first element bonds with the second element; and a second compound in which a tetrahedron of first element oxide, and positive ions of the second element in gaps between tetrahedrons of the first element oxide.

(10)

The negative electrode active material according to any one of (1) to (9), in which a content amount of the first element is not less than 30 at % but not more than 70 at % in a total amount of the first element, the second element, and oxygen, a content amount of the second element is not less than 1 at % but not more than 30 at % in the total amount of the first element, the second element, and oxygen, and a content amount of the oxygen is not less than 20 at % but not more than 70 at % in the total amount of the first element, the second element, and oxygen.

(11)

The negative electrode active material according to any one of (1) to (10), being in a thin-film form or in a powder form.

(12)

A production method of a negative electrode active material, including:

thermally vaporizing a material including at least one first element selected from the group consisting of silicon, tin, and germanium, oxide of the at least one first element, and at least one second element selected from the group consisting of copper, boron, phosphorous, aluminum, gallium, arsenic, antimony, and sodium.

(13)

The production method of the negative electrode active material according to (12), further including: preparing the material by immersing powder of the first element, powder of first element oxide, and powder of the second element in a liquid, and evaporating off the liquid.

(14)

A thin film electrode including: a current collector; and a thin film provided on the current collector, the thin film including the negative electrode active material according to any one of (1) to (11).

(15)

A battery, including:

a negative electrode including the negative electrode active material according to any one of (1) to (11), a positive electrode; and an electrolyte.

(16)

A battery pack, including:

the battery according to (15); and a control unit configured to control the battery.

(17)

An electronic device, including: the battery according to (15), the electronic device being configured to receive power from the battery.

(18)

An electric vehicle, including:

the battery according to (15);

a converting device configured to receive power from the battery and convert the power into a driving power of the electric vehicle; and a control device configured to perform information processing regarding vehicle control according to information regarding the battery.

(19)

A power storage device, including: the battery according to (15), the power storage device being configured to supply power to an electronic device connected to the battery.

(20) A power system, including: the battery according to (15), the power system being configured to receive power supplied from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A negative electrode active material, comprising:
a matrix including
oxygen,
at least a first element selected from the group consisting of silicon, tin, and germanium, and
at least a second element selected from the group consisting of copper, boron, phosphorous, aluminum, gallium, arsenic, antimony, and sodium;
wherein the second element bonds with oxygen; and
wherein a cluster includes the first element and is dispersed in the matrix;
wherein the bonding between the second element and oxygen is covalent bonding; and
wherein the matrix includes bonding represented by formula (1):

$$M1-O-M2 \tag{1}$$

wherein M1 represents the first element and M2 represents the second element.

2. The negative electrode active material according to claim 1, wherein the matrix and the cluster are amorphous.

3. The negative electrode active material according to claim 1, wherein an average size of the cluster is 2 nm or less.

4. The negative electrode active material according to claim 1, wherein the cluster is substantially uniformly distributed in the matrix.

5. The negative electrode active material according to claim 1, wherein
the first element includes silicon,
the second element includes copper,
a Cu2p waveform obtainable by X-ray photoelectron spectroscopy does not have a peak top in a range of bonding energy between 931 eV and 933 eV, and has a peak top in a range of bonding energy from 933 eV to 935 eV.

6. The negative electrode active material according to claim 5, wherein a peak having the peak top in the range of bonding energy from 933 eV to 935 eV is associated to Cu—O or Si—O—Cu.

7. The negative electrode active material according to claim 1, substantially not comprising: a first compound in which the first element bonds with the second element; and a second compound in which a tetrahedron of first element oxide, and positive ions of the second element in gaps between tetrahedrons of the first element oxide.

8. The negative electrode active material according to claim 1, wherein
a content amount of the first element is from 30 at % to 70 at % in a total amount of the first element, the second element, and oxygen,
a content amount of the second element is from 1 at % to 30 at % in the total amount of the first element, the second element, and oxygen, and
a content amount of the oxygen is from 20 at % to 70 at % in the total amount of the first element, the second element, and oxygen.

9. The negative electrode active material according to claim 1, wherein the negative electrode active material is in a thin-film form or in a powder form.

10. A production method of a negative electrode active material, comprising: thermally vaporizing a material including at least a first element selected from the group consisting of silicon, tin, and germanium, oxide, and at least a second element selected from the group consisting of copper, boron, phosphorous, aluminum, gallium, arsenic, antimony, and sodium,
forming a matrix including
oxygen,
at least the first element, and
at least the second element
wherein the second element bonds with oxygen; and
wherein a cluster includes the first element and is dispersed in the matrix;
wherein the bonding between the second element and oxygen is covalent bonding; and
wherein the matrix includes bonding represented by formula (1):

$$M1-O-M2 \tag{1}$$

wherein M1 represents the first element and M2 represents the second element.

11. The production method of the negative electrode active material according to claim 10, further comprising: preparing the material by immersing powder of the first element, powder of first element oxide, and powder of the second element in a liquid, and evaporating off the liquid.

12. A thin film electrode comprising: a current collector; and a thin film provided on the current collector,
wherein the thin film including the negative electrode active material according to claim 1.

13. A battery, comprising:
a negative electrode including the negative electrode active material according to claim 1;
a positive electrode; and
an electrolyte.

14. A battery pack, comprising:
the battery according to claim 13; and
a charging and discharging circuit configured to control the battery.

15. An electronic device, comprising:
the battery according to claim 13; and
an electronic circuit configured to receive power supplied from the battery.

16. An electric vehicle, comprising:
the battery according to claim 13;
a motor configured to receive power from the battery and convert the power into a driving power of the electric vehicle; and
an information processing device configured to perform information processing regarding vehicle control according to information regarding the battery.

17. A power storage device, comprising: the battery according to claim 13,
wherein the battery is configured to supply power to an electronic device connected to the battery.

18. A power system, comprising:
the battery according to claim 13; and
an electronic device configured to receive power supplied from the battery.

19. The negative electrode active material according to claim 1, wherein the negative electrode active material is formed by evaporation by heating.

20. The negative electrode active material according to claim 1, wherein heating is by electron beam heating.

* * * * *